US011921359B2

(12) United States Patent
Glöge et al.

(10) Patent No.: US 11,921,359 B2
(45) Date of Patent: Mar. 5, 2024

(54) SPECTACLE LENS COMPRISING AT LEAST ONE ULTRATHIN LENS AND PROCESS FOR PRODUCTION THEREOF

(71) Applicant: Carl Zeiss Vision International GmbH, Aalen (DE)

(72) Inventors: Thomas Glöge, Schorndorf (DE); Jeremias Gromotka, Aalen (DE)

(73) Assignee: Carl Zeiss Vision International GmbH, Aalen (DE)

( * ) Notice: Subject to any disclaimer, the term of this patent is extended or adjusted under 35 U.S.C. 154(b) by 92 days.

(21) Appl. No.: 16/392,760

(22) Filed: Apr. 24, 2019

(65) Prior Publication Data
US 2019/0324289 A1 Oct. 24, 2019

(30) Foreign Application Priority Data

Apr. 24, 2018 (EP) ..................... 18169133

(51) Int. Cl.
G02C 7/02 (2006.01)
B24B 9/14 (2006.01)
B29D 11/00 (2006.01)
B32B 7/12 (2006.01)
B32B 17/10 (2006.01)
(Continued)

(52) U.S. Cl.
CPC .............. G02C 7/02 (2013.01); B24B 9/14 (2013.01); B29D 11/00403 (2013.01); B29D 11/0073 (2013.01); B29D 11/00865 (2013.01); B29D 11/00923 (2013.01); B32B 7/12 (2013.01); B32B 17/1055 (2013.01); G02B 1/041 (2013.01); G02B 1/10 (2013.01); B29D 11/00115 (2013.01); B32B 2551/00 (2013.01); G02C 2202/16 (2013.01)

(58) Field of Classification Search
None
See application file for complete search history.

(56) References Cited

U.S. PATENT DOCUMENTS 3,998,531 A   12/1976   Marzouk
4,211,823 A    7/1980   Masahura
(Continued)

FOREIGN PATENT DOCUMENTS

AU   1998064179 B2   5/1981
AU      531647 B2   9/1983
(Continued)

OTHER PUBLICATIONS https://www.merriam-webster.com/dictionary/lens.*
(Continued)

Primary Examiner — Tae H Yoon
(74) Attorney, Agent, or Firm — Tautz & Schuhmacher LLC; Georg Hasselmann

(57) ABSTRACT

A spectacle lens includes proceeding from a front face on the object side of the spectacle lens to an opposite reverse face of the spectacle lens, at least components A, B, and C. The component A includes an ultrathin lens, the component B includes at least one of a polymeric material or a mineral glass, and the component C includes at least one of a functional layer or an ultrathin lens. The spectacle lens has no damage after impact of a steel ball with a diameter of 15.87 mm and a weight of 16.36 g from a height of 1.27 m.

19 Claims, 2 Drawing Sheets

(51) Int. Cl.
*G02B 1/04* (2006.01)
*G02B 1/10* (2015.01)

(56) References Cited

U.S. PATENT DOCUMENTS

| | | | |
|---|---|---|---|
| 4,294,950 A | 10/1981 | Kato | |
| 4,355,135 A | 10/1982 | January | |
| 4,679,918 A | 7/1987 | Ace | |
| 5,064,712 A * | 11/1991 | Fretz, Jr. | B32B 27/308 |
| | | | 428/212 |
| 5,230,929 A * | 7/1993 | Caporiccio | B05D 1/62 |
| | | | 427/316 |
| 5,989,628 A * | 11/1999 | Haga | G02B 1/041 |
| | | | 427/164 |
| 7,838,068 B2 | 11/2010 | Lacan et al. | |
| 8,503,080 B2 | 8/2013 | Seesselberg et al. | |
| 8,553,333 B2 * | 10/2013 | Chang | C23C 18/1216 |
| | | | 359/619 |
| 9,134,547 B2 * | 9/2015 | McCabe | B29C 45/14819 |
| 9,278,885 B2 | 3/2016 | Lacan et al. | |
| 9,500,860 B2 | 11/2016 | Gloege et al. | |
| 9,817,155 B2 | 8/2017 | Neuffer | |
| 9,957,398 B2 | 5/2018 | Hugenberg et al. | |
| 10,179,831 B2 | 1/2019 | Weippert | |
| 10,259,744 B2 | 4/2019 | Gloege | |
| 10,338,278 B2 | 7/2019 | Gloege et al. | |
| 10,670,884 B2 * | 6/2020 | Gloge | B29D 11/00413 |
| 2004/0220292 A1 | 11/2004 | Momoda et al. | |
| 2006/0066947 A1 | 3/2006 | Henry | |
| 2006/0269741 A1 | 11/2006 | Izumi et al. | |
| 2013/0010253 A1 * | 1/2013 | Tokumaru | B29D 11/00644 |
| | | | 351/49 |
| 2013/0206328 A1 | 8/2013 | Chiu et al. | |
| 2014/0332154 A1 * | 11/2014 | Shan | B32B 38/04 |
| | | | 156/253 |
| 2017/0153464 A1 * | 6/2017 | Tamura | B32B 27/365 |
| 2017/0297955 A1 | 10/2017 | Gloege | |
| 2018/0001435 A1 * | 1/2018 | Hale | G05B 19/4097 |
| 2018/0099307 A1 * | 4/2018 | Takeda | G02B 5/0294 |
| 2019/0146242 A1 | 5/2019 | Mappes et al. | |
| 2019/0250430 A1 | 8/2019 | Mappes et al. | |

FOREIGN PATENT DOCUMENTS

| | | | |
|---|---|---|---|
| AU | 2003225785 A1 * | 9/2003 | |
| AU | 2003231046 A1 * | 11/2003 | |
| CA | 2248832 A1 * | 9/1998 | |
| DE | 19848591 A1 | 10/1999 | |
| DE | 102007025151 A1 | 9/2008 | |
| DE | 102012210185 A1 | 12/2013 | |
| DE | 102014202609 A1 | 8/2015 | |
| DE | 102015209794 A1 | 12/2016 | |
| EP | 028974 A1 | 5/1981 | |
| EP | 0028975 A1 * | 5/1981 | |
| EP | 028975 A1 | 5/1981 | |
| EP | 182503 A2 | 5/1986 | |
| EP | 217502 A1 | 4/1987 | |
| EP | 1392613 A1 | 3/2004 | |
| EP | 1674898 A1 | 6/2006 | |
| EP | 1965232 A1 | 9/2008 | |
| EP | 2437084 A1 | 4/2012 | |
| EP | 2578649 A1 | 4/2013 | |
| EP | 2664659 A1 | 11/2013 | |
| EP | 3273292 A1 | 1/2018 | |
| EP | 3312661 A1 | 4/2018 | |
| WO | 9845113 A1 | 10/1998 | |
| WO | 2005050265 A1 | 6/2005 | |
| WO | 2006050891 A1 | 5/2006 | |
| WO | 2009029198 A2 | 3/2009 | |
| WO | 2009056196 A1 | 5/2009 | |
| WO | 2009156784 A1 | 12/2009 | |
| WO | 2015121341 A1 | 8/2015 | |
| WO | 2015160612 A1 | 10/2015 | |

OTHER PUBLICATIONS https://www.dictionary.com/browse/spectacle.*
KOEPPEN; "Konzeption und Entwicklung von Gleitsichtglaesern [Conception and design of progressive lenses]" ; DOZ; Oct. 1995, pp. 42-45.
"Ophthalmic optics—Spectacle lenses—Vocabulary (ISO 13666:2012)," German and English version EN ISO 13666:2012, Oct. 2013.
Extended European Search report issued in EP 18169133.8, to which this application claims priority, and English-language translation thereof, dated Sep. 7, 2018.
Office action by the European Patent Office issued in EP 19 170 846.0, which is a counterpart hereof, dated Feb. 15, 2021, and English-language machine translation thereof.
Extended European Search report issued in EP 19170846, which is a counterpart application hereof, dated Sep. 5, 2019.
Office action by the European Patent Office issued in EP 19 170 846.0, which is a counterpart hereof, dated Jul. 29, 2020, and English-language machine translation thereof.
Internet article "Optical Contact Bonding," retrieved from the url https://en.wikipedia.org/w/index.php?title=Optical_contact_bonding &oldid=1024255592, last accessed Dec. 6, 2021.

* cited by examiner

SPECTACLE LENS COMPRISING AT LEAST ONE ULTRATHIN LENS AND PROCESS FOR PRODUCTION THEREOF

CROSS REFERENCE TO RELATED APPLICATIONS

This application claims priority to European patent application EP 18169133.8 filed on Apr. 24, 2018, which is hereby incorporated by reference in its entirety.

TECHNICAL FIELD

The present disclosure relates to a spectacle lens comprising at least one ultrathin lens, wherein the spectacle lens has no damage after impact of a steel ball of the size 15.87 mm and weight 16.36 g from a height of 1.27 m. The present disclosure further relates to at least one process for producing such a spectacle lens.

BACKGROUND

EP 0 028 975 A1 describes a composite lens in which a lens comprising an organic material is disposed between two glass films. In this case, the organic material which is cast between the two glass films in the production of the composite lens is to be polymerizable without shrinkage. In the composite lens, the organic material typically has a middle thickness of >1 mm. The two glass films each have a middle thickness of 0.1 mm to 0.5 mm. According to EP 0 028 975 A1, the composite lens described here combines the advantages of mineral glass in relation to scratch resistance, for example, with the advantages of organic materials in relation to weight. EP 0 028 975 A1 does not contain any pointer to reduce the respective middle thickness of the glass films or the thickness of the glass films over the entire glass area.

U.S. Pat. No. 3,998,531 describes an ophthalmic lens made of a transparent plastic material, the front face and reverse face of which are each covered by a lens. Each lens has a thickness in the order of magnitude of 1 mm. The plastic material has a higher refractive index than the glass. For production of this ophthalmic lens, the plastic material is shaped between the two lenses with supply of heat and pressure on the respective lens and bonded to the two lenses. The ophthalmic lens is lightweight and scratch-resistant. U.S. Pat. No. 3,998,531 does not contain any pointer to the effect that the thickness of the respective lens can be reduced. U.S. Pat. No. 3,998,531 also does not contain any pointer to provide the ophthalmic lens described here with a plastic material having a lower or equal refractive index to the two lenses.

EP 0 182 503 A2 discloses an ophthalmic composite spectacle lens comprising a thin glass layer having a thickness of 0.5 mm to 2.0 mm on the object side and a plastic layer on the eye side. Since the glass layer can break in the course of aging, especially in conjunction with a thin plastic layer, the average thickness of the glass layer in the composite spectacle lens is between 1.2 mm and 1.4 mm. The glass layer and the plastic layer are bonded to one another by a highly elastic adhesive. The reverse face of the glass layer here has a different curvature than the front face of the plastic layer. The gap that arises as a result at the edge in particular is filled by the adhesive used. The composite spectacle lens has a lower weight than a corresponding spectacle lens made of mineral glass. Since the glass layer imparts stability to the composite spectacle lens, the plastic layer can be reduced to a lower thickness than would be the case in a conventional plastic-based spectacle lens. Furthermore, the composite spectacle lens disclosed in EP 0 182 503 A2 is designed to meet the impact resistance and shatter resistance requirements of the US Food and Drug Administration in relation to spectacle lenses.

SUMMARY

It is an object of the present disclosure to provide a spectacle lens that has an attractive cosmetic appearance and nevertheless simultaneously meets the FDA requirements in relation to impact resistance and shatter resistance. It is a further object of the present disclosure to provide a process for producing the spectacle lens.

This object is achieved by providing a spectacle lens as disclosed herein. This object is further achieved by providing a process for the production of a spectacle lens as disclosed herein.

Spectacle lenses can be classified by their function according to DIN EN ISO 13666:2013-10, paragraph 8.1. In the context of the present disclosure, spectacle lenses are typically afocal spectacle lenses or zero lenses according to DIN EN ISO 13666:2013-10, paragraph 8.2.3, i.e., spectacle lenses with the nominal dioptric power of zero, and correction spectacle lenses according to DIN EN ISO 13666:2013-10, paragraph 8.1.3, i.e., spectacle lenses with dioptric power. According to DIN EN ISO 13666:2013-10, paragraph 9.3, dioptric power is the collective term for the focusing and prismatic power of a spectacle lens.

The FDA requirements in relation to impact resistance and shatter resistance of spectacle lenses are set out in 21 CFR 801.410. According to the ball drop test described therein, a spectacle lens has to withstand the impact of a steel ball of size 15.87 mm and weight 16.36 g from a height of 1.27 mm without breaking.

Particularly for spectacle lenses with a negative vertex power or minus lenses, which are defined as spectacle lenses by DIN EN ISO 13666:2013-10, section 9.14, and which cause parallel incident light to diverge, such that it appears to come from a virtual focal point of the spectacle lenses, the cosmetic appearance is often unattractive with regard to the ball drop test that has to be passed. The middle thickness of a minus lens is often not provided for production-related reasons, but with a view to the FDA requirements in relation to the ball drop test that have to be satisfied. A higher middle thickness in turn results in a higher edge thickness of the spectacle lens, which often causes minus lenses to protrude beyond the frame edge and be visually unattractive.

According to DIN EN ISO 13666:2013-10, section 8.1.14, middle thickness is the thickness of a spectacle lens measured at the optical midpoint or construction reference point, or, in the case of a varifocal lens or a degressive spectacle lens, at the prism reference point.

According to DIN EN ISO 13666:2013-10, section 8.1.15, edge thickness is the thickness at a point on the edge of the edged or unedged spectacle lens, measured approximately parallel to the optical axis.

The spectacle lenses of the disclosure comprise, on the front face on the object side of the spectacle lens, at least one component A comprising at least one ultrathin lens. On the opposite, eye-side reverse face of the spectacle lens, component C may likewise comprise an ultrathin lens, where the ultrathin lens of component A and the ultrathin lens of component C may be identical or different than one another. The ultrathin lenses of the two components A and C may, for example, be identical in relation to the glass composition, to the average thickness or to the shape. The glass composition, the average thickness and/or the shape of the ultrathin lens of component A may alternatively be different than the glass composition, the average thickness and/or the shape of the ultrathin lens of component C. For example, the ultrathin lens of component A and the ultrathin lens of component C may be based on an identical glass composition; the average thickness, and/or shape of the two ultrathin lenses may be different than one another.

The middle thickness of the spectacle lenses of the disclosure comprising components A, B, and C or comprising components A and B or comprising components B and C is typically within a range from 0.34 mm to 2.22 mm, more typically within a range from 0.40 mm to 2.02 mm, even more typically 0.41 mm to 1.84 mm, particularly within a range from 0.47 mm to 1.75 mm, more particularly within a range from 0.59 mm to 1.73 mm and most typically within a range from 0.70 mm to 1.71 mm. For the middle thickness of the spectacle lenses of the disclosure, the above definition according to DIN EN ISO 13666:2013-10, section 8.1.14 should be employed.

In spite of the low middle thickness, the spectacle lenses of the disclosure meet the FDA demands in relation to impact resistance and shatter resistance, and withstand the above-described ball drop test without breaking and without any damage. "Without damage" means that the spectacle lens after the ball drop test does not have any fault profile. "No fault profile" should be understood to mean such that the spectacle lens of the disclosure does not have any splintering, any star-shaped cracks or any scratches, but withstands the ball drop test unchanged, meaning that there is no visible difference in the visual appearance of the spectacle lens before and after the ball drop test.

A further advantage of the spectacle lenses of the disclosure for a spectacle wearer that is not to be neglected is that these combine the advantageous properties of mineral glass in relation to hardness and scratch resistance, for example, and the advantageous properties of polymeric material in relation to weight. Furthermore, the higher density of the spectacle lens based on mineral glass is more than compensated for by the very low middle thickness of the spectacle lens, such that there is no weight disadvantage for a spectacle wearer.

The ultrathin lens of component A and of component C may be based on various glass compositions. Component A and component C may comprise an ultrathin lens which is identical or different in relation to the glass composition. The glass composition for the ultrathin lenses may, for example, be borosilicate glass, aluminoborosilicate glass, or alkali-free borosilicate glass. Typically, the ultrathin lens of component A or of component C is based in each case on a borosilicate glass or an aluminoborosilicate glass.

The ultrathin lens of component A or of component C in each case typically has an average thickness from a range from 10 μm to 250 μm, more typically from a range from 13 μm to 240 μm, even more typically from a range from 16 μm to 230 μm, particularly from a range from 18 μm to 220 μm and most typically from a range from 19 μm to 210 μm. Especially typically, the ultrathin lens of component A or the ultrathin lens of component C in each case has an average thickness from a range from 90 μm to 120 μm.

The average thickness of the ultrathin lens of component A or component C is understood in each case to mean the arithmetic average, unless stated otherwise.

Below an average thickness of 10 μm, the ultrathin lens of component A or of component C is too mechanically unstable to be able to be used in one of the processes described hereinafter for production of a spectacle lens of the disclosure. Above an average thickness of 210 μm, the ultrathin lens of component A or of component C can lead to spectacle lenses of the disclosure that would have too great an edge thickness or too great a middle thickness of the spectacle lens.

The average thickness of the ultrathin lens of components A and C is measured in each case typically with the Filmetrics F10-HC instrument (from Filmetrics Inc.). The average thickness of the ultrathin lens of components A and C is typically determined in each case using the ultrathin lens in the form as it is actually used. The average thickness of the ultrathin lens of components A and C is thus determined in each case either using a planar ultrathin lens or using a formed ultrathin lens prior to the joining to component B. Alternatively, the average thickness of the ultrathin lens of components A and C can be determined in each case by means of a scanning electron micrograph using a polished section. The respective average thickness can be determined by means of a scanning electron micrograph either using the ultrathin lens of component A, using the ultrathin lens of component C or using the inventive spectacle lens comprising components A, B, and C. For this purpose, the thickness of the ultrathin lens of component A or of component C is determined in each case at least at 100 sites and statistically averaged. Typically, the average thickness of the ultrathin lens of component A or of component C is determined by means of a scanning electron micrograph using a polished section of the spectacle lens of the disclosure. If further components are present in the spectacle lens of the disclosure, the respective average thickness thereof is likewise determined as described above.

In one exemplary embodiment, the relative standard deviation of the thickness distribution of the ultrathin lens of component A or C is in each case 0.1% to 100%, typically 0.2% to 81%, more typically 0.3% to 66% and most typically 0.4% to 24%. The relative standard deviation in [%] is the quotient of calculated standard deviation and average thickness.

The ultrathin lens of component A and of component C may have the same average thickness in each case. The average thicknesses of the ultrathin lenses of components A and C may also be different. Typically, the average thicknesses of the ultrathin lenses of components A and C are each the same.

The ultrathin lens of component A or of component C in each case typically has a surface roughness Ra of <1 nm. Further typically, the surface roughness Ra of the ultrathin lens of component A or of component C is in each case within a range from 0.1 nm to 0.8 nm, more typically within a range from 0.3 nm to 0.7 nm and most typically within a range from 0.4 nm to 0.6 nm. The aforementioned values for surface roughness Ra are each based on the front face and the reverse face of the ultrathin lens of component A or C of an unformed, planar ultrathin lens. After forming, the aforementioned values are in each case applicable only to that area of the ultrathin lens that has not been brought into contact with the shaped body. Depending on the shaped body used for forming, the aforementioned values may also be applicable to the area of the ultrathin lens that was in contact with the shaped body used for forming. The surface roughness Ra of the ultrathin lens of component A or of component C is typically determined by means of white light interferometry, typically with the NewView 7100 instrument (from Zygo Corporation).

If the ultrathin lens of component A or of component C has further superficial unevenness, the area analysis of the respective surface can also be determined by phase-measuring deflectometry, typically with the SpecGage instrument (from 3D-Shape GmbH).

The transformation temperature $T_G$ of the ultrathin lens of component A or of the ultrathin lens of component C is in each case typically within a range from 400° C. to 800° C., further typically within a range from 430° C. to 770° C., more typically within a range from 490° C. to 740° C. and most typically within a range from 530° C. to 730° C. The transformation temperature $T_G$ of the ultrathin lens of component A or C can be determined in each case by means of dynamic-mechanical analysis, typically with the DMA 8000 Dynamic Mechanical Analyzer instrument (from Perkin Elmer Inc.), or by means of dynamic differential calorimetry, typically with the DSC204CEL instrument with TASC414/3A or CC2001 controller (each from Erich NETZSCH GmbH & Co. Holding KG). Typically, the transformation temperature $T_G$ of the ultrathin lens of component A or C is determined in each case by means of dynamic differential calorimetry.

The coefficient of expansion of the ultrathin lens of component A or of component C is in each case typically within a range from $1.8 \cdot 10^{-6} K^{-1}$ to $9.1 \cdot 10^{-6} K^{-1}$, further typically within a range from $2.1 \cdot 10^{-6} K^{-1}$ to $8.8 \cdot 10^{-6} K^{-1}$, more typically within a range from $2.6 \cdot 10^{-6} K^{-1}$ to $8.2 \cdot 10^{-6} K^{-1}$ and most typically within a range from $3.0 \cdot 10^{-6} K^{-1}$ to $7.4 \cdot 10^{-6} K^{-1}$, based in each case on the temperature range from 20° C. to 300° C. The coefficient of expansion of the ultrathin lens of component A or of component C is typically detected in each case by means of dilatometry, typically with the DIL 402 E/7 instrument (from Erich NETZSCH GmbH & Co. Holding KG).

The ultrathin lens of component A and of component C typically in each case do not comprise any colorants. Further typically, the transmittance of the ultrathin lens of component A or of component C in the wavelength range from 400 nm to 800 nm is in each case ≥90%, more typically ≥92%. The transmittance of the ultrathin lens of component A or of component C is typically determined by means of a UV/VIS spectrophotometer, typically with the LAMBDA 950 UV/Vis/NIR Spectrophotometer (from Perkin Elmer Inc.).

The ultrathin lens of component A or of component C in each case typically has a refractive index from a range of n=1.490 to n=1.950, further typically from a range of n=1.501 to n=1.799, more typically from a range of n=1.510 to n=1.755 and most typically from a range from n=1.521 to n=1.747, where the refractive index is reported for the wavelength of the sodium D line. The refractive index of the respective ultrathin lens of component A or of component C is typically matched to the respectively directly adjoining functional layer and/or the respectively directly adjoining component, typically component B. At the respective ultrathin lens/functional layer, ultrathin lens/further component interfaces of the spectacle lens of the disclosure, typically component B or ultrathin lens/adhesive interface, the difference in refractive index is in each case typically less than 0.03, more typically less than 0.01, irrespective of whether it is the ultrathin lens of component A, the ultrathin lens of component C or the ultrathin lens of a further component of the spectacle lens of the disclosure. In one exemplary embodiment of the disclosure, all constituents of the spectacle lens of the disclosure, i.e., the ultrathin lens of component A or C, component B, further optional components of the spectacle lens of the disclosure, the adhesive(s) optionally used, and all functional layers, excluding the multilayer coatings, for example a multilayer antireflection layer or a multilayer reflection layer, that are arranged within the spectacle lens of the disclosure, typically between components A and C, have the same refractive index. In this exemplary embodiment, the same refractive index tolerates a difference in refractive index from a range from 0.005 to 0.015. The refractive index of the ultrathin lens of component A and of component C, of component B and of further components of the spectacle lens of the disclosure is typically determined separately by refractometry on the respective constituents of the spectacle lens of the disclosure. The measuring instrument used may, for example, be the Anton Paar Abbemat MW instrument (from Anton Paar GmbH).

The ultrathin lens of component A or of component C in each case typically has an Abbe number within a range from 20 to 85, further typically within a range from 23 to 74, more typically within a range from 29 to 66 and most typically within a range from 33 to 61. In one exemplary embodiment of the disclosure, all constituents of the spectacle lens of the disclosure, i.e., the ultrathin lens of component A or C, component B, further optional components of the spectacle lens of the disclosure, the adhesive(s) optionally used, and all functional layers present, excluding the multilayer coatings, for example a multilayer antireflection layer or a multilayer reflection layer, that are arranged within the spectacle lens of the disclosure, typically between components A and C, have the same Abbe number. In this exemplary embodiment, the same Abbe number tolerates a difference in the Abbe number from a range from 0.1 to 5, typically from a range from 0.1 to 2.1. The higher the refractive index of all constituents of the spectacle lens of the disclosure, the greater the differences in the Abbe number that are tolerated.

In one exemplary embodiment of the disclosure, the ultrathin lens of component A or of component C and the organic material of component B or the mineral glass of component B each have a maximum Abbe number for a given refractive index n.

In one exemplary embodiment of the disclosure, the ultrathin lens of component A or component C in each case has a transformation temperature $T_G$ from a range from 421° C. to 781° C., typically from a range from 501° C. to 766° C., and in each case has a coefficient of expansion for the temperature range from 20° C. to 300° C. from a range from $2.9 \cdot 10^{-6} K^{-1}$ to $8.3 \cdot 10^{-6} K^{-1}$, typically from a range from $3.1 \cdot 10^{-6} K^{-1}$ to $7.3 \cdot 10^{-6} K^{-1}$. In this exemplary embodiment, the transformation temperature $T_G$ and/or the coefficient of expansion of the ultrathin lens of component A and of the ultrathin lens of component C may each be the same or different.

In a further exemplary embodiment of the disclosure, the ultrathin lens of component A or of component C in each case has an average thickness from a range from 17 μm to 190 μm, typically from a range from 24 μm to 166 μm, and a transformation temperature $T_G$ from a range from 510° C. to 730° C., typically from a range from 555° C. to 721° C. In this exemplary embodiment, the average thickness and/or transformation temperature $T_G$ of the ultrathin lens of component A and of the ultrathin lens of component C may each be the same or different.

In a typical exemplary embodiment, the ultrathin lenses of components A or C and further ultrathin lenses optionally present in the spectacle lens of the disclosure have no photochromic properties.

Ultrathin lenses are commercially available, for example, under the D 263® T eco, D 263® LA eco, D 263® M, AF 32® eco, SCHOTT AS 87 eco, B 270® i names, each from Schott AG, or Corning Willow Glass or Corning Gorilla Glass, each from Corning Inc.

The ultrathin lens of component A or of component C may each have different shapes, for example planar or a particular shape. In connection with the shape of the ultrathin lens, "planar" is understood to mean that the ultrathin lens does not have any macroscopically visible bending or curvature. If the ultrathin lenses of components A and C have a nonplanar surface, it is possible to achieve a desired surface topography, for example spherical or toric, by deforming a planar ultrathin lens on a corresponding negative mold. For example, the ultrathin lens of component A or of component C may in each case be configured in the form of a spherical lens with a particular radius of curvature. The shape of the ultrathin lens of components A and C may be identical or different. For forming of a planar ultrathin lens, it may first be cut out, typically in the form of a circle, for example by means of a laser. In the edge region, this cut-out ultrathin lens circle may then be flame-treated in order to seal any microcracks that have formed. In order to produce a minimum amount of ultrathin lens offcut material, the cutout of the ultrathin lens is selected such that a minimum amount of excess ultrathin lens has to be removed after the joining of components A, B, and C of the spectacle lens of the disclosure. The cut-out ultrathin lens may, for example, be placed onto a mold shell suitable for forming, optionally secured by means of a holder, and typically heated together with the mold shell, optionally together with the holder, up to the transformation temperature $T_G$ of the glass composition or up to a temperature which is typically not more than 20° C. above the transformation temperature $T_G$ of the glass composition. The mold shell may, for example, have a convex or concave shape. For example, the cut-out ultrathin lens is pressed into the mold shell with the aid of a counterpart that fits into the mold shell, or the ultrathin lens cutout is formed into the mold shell with application of reduced pressure and/or simply by means of gravity. Typically, the forming of the ultrathin lens takes place with application of reduced pressure into a mold shell. The formed ultrathin lens is typically allowed to cool completely in or above the mold shell before it is separated from the mold shell. The forming of a typically planar cutout of an ultrathin lens is typically effected in a protective gas atmosphere. The mold shell may be configured here as negative mold of the front face or reverse face of the ultrathin lens to be achieved in the forming operation. For example, the mold shell may be formed spherically, aspherically, rotationally symmetrically, torically, atorically, or as a symmetric free-form face or unsymmetric free-form face. Alternatively, the ultrathin lens may be formed in uncut form, typically planar form, with the aid of a thermoforming process. In the presence of further components of the spectacle lens of the disclosure comprising at least one ultrathin lens, the above details are correspondingly applicable.

The radius of curvature of an ultrathin lens is typically within a range from 10 mm to infinity, typically within a range from 20 mm to 1600 mm, more typically within a range from 35 mm to 1535 mm, even more typically within a range from 56 mm to 600 mm, particularly within a range from 66 mm to 481 mm, and more particularly within a range from 75 mm to 376 mm. A radius of curvature of the ultrathin lens of infinity corresponds here to a planar surface. In the case of nonspherical surfaces of the ultrathin lens, the above-specified radii of curvature are each based on an approximate spherical form.

The mold shell usable for forming typically comprises a material that can be processed with removal of material, does not cause any structures in the formed ultrathin lens and additionally does not enter into any inextricable bond with the ultrathin lens. The mold shell may consist, for example, of graphite, a metal (alloy) or a ceramic, as described, for example, in WO 2006/050891 A2. The mold shell may also have been surface-modified, so as to further minimize adhesion of the ultrathin lens.

The front face of the ultrathin lens $V_{DA}$ of component A is that face of the ultrathin lens that is on the object side in the spectacle lens of the disclosure. The front face of the ultrathin lens $V_{DC}$ of component C is that face of the ultrathin lens which, in the spectacle lens of the disclosure, is on the object side in the direction of component B or in the direction of a component of the spectacle lens of the disclosure arranged further to the object side. The reverse face of the ultrathin lens $R_{DA}$ of component A is that face of the ultrathin lens which, in the spectacle lens of the disclosure, is on the eye side in the direction of component B or in the direction of a component of the spectacle lens of the disclosure arranged further to the eye side. The reverse face of the ultrathin lens $R_{DC}$ of component C is that face of the ultrathin lens that is on the eye side in the spectacle lens of the disclosure. If more than one of components A, B and/or C is present in the spectacle lens of the disclosure, the front face thereof is defined in each case as that face arranged on the object side. In that case, the reverse face is correspondingly that face of the respective component which is on the eye side in the spectacle lens of the disclosure.

A functional layer is understood to mean a layer that imparts particular properties to the spectacle lens. A functional layer may, for example, be a hard lacquer layer, an antireflection layer, an electrically conductive or semiconductive layer, a reflection layer, a coloring layer, a polarizing layer, an antifog layer, or a clean-coat layer.

The ultrathin lens of component A typically comprises at least one functional layer $F_{VA}$ on the front face of the ultrathin lens $V_{DA}$. The functional layer $F_{VA}$ may comprise, for example, at least one antireflection layer, at least one electrically conductive or semiconductive layer, at least one antifog layer, and/or at least one clean-coat layer. Typically, the functional layer $F_{VA}$ comprises at least one antireflection layer, more typically at least one antireflection layer and at least one clean-coat layer, in which latter case the clean-coat layer is the outermost layer on the object side of the spectacle lens of the disclosure.

The ultrathin lens of component C typically comprises at least one functional layer $F_{RC}$ on the reverse face of the ultrathin lens $R_{DC}$. The functional layer $F_{RC}$, like the functional layer $F_{VA}$, may comprise, for example, an antireflection layer, at least one electrically conductive or semiconductive layer, at least one antifog layer, and/or at least one clean-coat layer. Typically, the functional layer $F_{RC}$ comprises at least one antireflection layer, more typically one antireflection layer, and a clean-coat layer, in which latter case the clean-coat layer is the outermost layer on the eye side of the spectacle lens of the disclosure.

The at least one functional layer $F_{VA}$ on the front face $V_{DA}$ of the ultrathin lens of component A and the at least one functional layer $F_{RC}$ on the reverse face $R_{DC}$ of the ultrathin lens of component C may be identical or different. Typically, the at least one functional layer $F_{VA}$ and the at least one functional layer $F_{RC}$ are identical.

The terms "layer" and "coating" are used interchangeably in the context of this disclosure.

If the functional layer $F_{VA}$ on the front face $V_{DA}$ of the ultrathin lens of component A comprises at least one antireflection layer, it typically comprises alternating discrete metal oxide, metal hydroxide, and/or metal oxide hydrate layers composed of or comprising aluminum, silicon, zirconium, titanium, yttrium, tantalum, neodymium, lanthanum, niobium, and/or praseodymium. In one exemplary embodiment of the disclosure, the antireflection layer comprises at least one metal oxide, metal hydroxide, and/or metal oxide hydrate layer composed of or comprising silicon, where typically at least one silicon oxide, silicon hydroxide, and/or silicon oxide hydrate layer constitutes the outer layer on the object side of the antireflection layer present on the ultrathin lens of component A.

If the functional layer $F_{RC}$ on the reverse face $R_{DC}$ of the ultrathin lens of component C comprises at least one antireflection layer, it typically comprises alternating discrete metal oxide, metal hydroxide and/or metal oxide hydrate layers composed of or comprising aluminum, silicon, zirconium, titanium, yttrium, tantalum, neodymium, lanthanum, niobium and/or praseodymium. In one exemplary embodiment of the disclosure, the antireflection layer comprises at least one metal oxide, metal hydroxide, and/or metal oxide hydrate layer composed of or comprising silicon, where typically at least one silicon oxide, silicon hydroxide, and/or silicon oxide hydrate layer constitutes the outer layer on the eye side of the antireflection layer present on component C.

In a further exemplary embodiment of the disclosure, the at least one antireflection layer of the spectacle lens of the disclosure has a total layer thickness from a range from 97 nm to 2000 nm, typically from a range from 112 nm to 1600 nm, further typically from a range from 121 nm to 1110 nm, more typically from a range from 132 nm to 760 nm and most typically from a range from 139 nm to 496 nm. The antireflection layer here typically comprises a metal oxide, metal hydroxide, and/or metal oxide hydrate layer composed of or comprising silicon, which typically forms the outermost layer of the antireflection layer. The outermost layer in this connection is understood to mean that layer of the antireflection layer which is furthest to the eye side or furthest to the object side in the spectacle lens of the disclosure.

In a further exemplary embodiment of the disclosure, the antireflection layer of the spectacle lens of the disclosure comprises, proceeding from the front face $V_{DA}$ of the ultrathin lens of component A or proceeding from the reverse face $R_{DC}$ of the ultrathin lens of component C, the following layer sequence in each case:
  a) metal oxide, metal hydroxide, and/or metal oxide hydrate layer composed of or comprising titanium,
  b) metal oxide, metal hydroxide, and/or metal oxide hydrate layer composed of or comprising silicon,
  c) metal oxide, metal hydroxide, and/or metal oxide hydrate layer composed of or comprising titanium,
  d) metal oxide, metal hydroxide, and/or metal oxide hydrate layer composed of or comprising silicon,
  e) metal oxide, metal hydroxide, and/or metal oxide hydrate layer composed of or comprising titanium, and
  f) metal oxide, metal hydroxide, and/or metal oxide hydrate layer composed of or comprising silicon.

In a further exemplary embodiment of the disclosure, the at least one antireflection layer of the spectacle lens of the disclosure comprises the layer sequence and layer thickness indicated in EP 2 437 084 A1, in FIGS. 3 and 5, in each case between the superhydrophobic layer and the hard lacquer layer. Typically, in the context of this disclosure, the layer that adjoins the hard lacquer layer therein in each case on the eye side and the layer that adjoins the superhydrophobic layer in each case on the object side is disposed on the front face in the spectacle lens of the disclosure, and the layer that adjoins the hard lacquer layer in each case on the object side and the layer that adjoins the superhydrophobic layer therein in each case on the eye side is disposed on the reverse face in the spectacle lens of the disclosure.

The at least one antireflection layer in the spectacle lens of the disclosure is typically produced by means of PVD methods.

If the functional layer $F_{VA}$ of the front face $V_{DA}$ of the ultrathin lens of component A and/or the functional layer $F_{RC}$ of the reverse face $R_{DC}$ of the ultrathin lens of component C in each case comprises at least one electrically conductive or semiconductive layer, this may comprise, for example, a layer composed of or comprising indium tin oxide (($In_2O_3)_{0.9}$ ($SnO_2)_{0.1}$; ITO), fluorine tin oxide ($SnO_2$: F; FTO), aluminum zinc oxide (ZnO:Al; AZO), and/or antimony tin oxide ($SaO_2$:Sb; ATO). Typically, the electrically conductive or semiconductive layer comprises a layer composed of or comprising ITO or composed of or comprising FTO.

An electrically conductive or semiconductive layer arranged as the outermost functional layer of the spectacle lens of the disclosure on the object side or eye side reduces or avoids the static charging of the spectacle lens of the disclosure. This in turn facilitates the cleaning of the spectacle lens of the disclosure. In one exemplary embodiment of the disclosure, the electrically conductive or semiconductive layer may be a layer of the antireflection layer.

If the functional layer $F_{VA}$ of the front face $V_{DA}$ of the ultrathin lens of component A and/or the functional layer $F_{RC}$ of the reverse face $R_{DA}$ of the ultrathin lens of component C in each case comprises at least one antifog layer, this typically comprises a silane derivative according to EP 2 664 659 A1, more typically according to claim 4 of EP 2 664 659 A1. Alternatively, the antifog layer may also be produced by the process described in DE 10 2015 209 794 A1, especially by the process described in claim 1 of DE 10 2015 209 794 A1. The antifog layer may be applied directly to the front face $V_{DA}$ of the ultrathin lens of component A or atop an antireflection layer present on the front face $V_{DA}$. If the antifog layer is applied atop an antireflection layer of component A, the outer layer of the antireflection layer on the object side typically comprises a metal oxide, metal hydroxide, and/or metal oxide hydrate layer composed of or comprising silicon. The antifog layer may be applied directly to the reverse face $R_{DC}$ of the ultrathin lens of component C or atop an antireflection layer present on the reverse face $R_{DC}$. If the antifog layer is applied atop an antireflection layer of component C, the outer layer of the antireflection layer on the eye side typically comprises a metal oxide, metal hydroxide, and/or metal oxide hydrate layer composed of or comprising silicon.

If the functional layer $F_{VA}$ on the front face $V_{DA}$ of the ultrathin lens of component A and/or the functional layer $F_{RC}$ on the reverse face $R_{DC}$ of the ultrathin lens of component C in each case comprises at least one clean-coat layer, which typically comprises a material having oleophobic and hydrophobic properties, as disclosed, for example, in EP 1 392 613 A1, on which water assumes a contact angle of more than 90°, typically of more than 100°, and more typically more than 110°. The clean-coat layer typically comprises an organofluorine layer with covalent attachment to the substrate according to DE 198 48 591 A1, claim 1, or a layer based on perfluoropolyethers.

In one exemplary embodiment of the disclosure, the front face $V_{DA}$ of the ultrathin lens of component A, proceeding from the front face $V_{DA}$ in the direction of the object, or the reverse face $R_{DC}$ of the ultrathin lens of component C, proceeding from the reverse face $R_{DC}$, is in each case covered by the following functional layers $F_{VA}$ or $F_{RC}$:

a) Optionally, at least one electrically conductive or semiconductive layer,
b) at least one antireflection layer, and
c) at least one antifog layer or at least one clean-coat layer.

In this exemplary embodiment, the optionally present at least one electrically conductive or semiconductive layer may also be present as a constituent of the at least one antireflection layer, i.e., at least one of the layers that forms part of the antireflection layer may be present on the front face $V_{DA}$ of the ultrathin lens of component A, followed on the object side by the electrically conductive or semiconductive layer, the rest of the layers that form part of the antireflection layer, and followed further to the object side by the antifog layer or the clean-coat layer. The same is true on the eye side at the reverse face $R_{DC}$ of the ultrathin lens of component C.

The ultrathin lens of component A typically comprises at least one functional layer $F_{RA}$ on the reverse face of the ultrathin lens $R_{DA}$, i.e., the face of the ultrathin lens which, in the spectacle lens of the disclosure, is directed in the direction of component B or in the direction of a component arranged further to the object side of the spectacle lens of the disclosure. The functional layer $F_{RA}$ may comprise, for example, at least one coloring layer, at least one photochromic layer, at least one polarizing layer, and/or at least one reflection layer.

In one exemplary embodiment of the disclosure, the at least one functional layer $F_{RA}$ may correspond to the at least one functional layer $F_{VB}$, note being taken that in the presence of multiple functional layers $F_{RA}$ or $F_{VB}$ the typical layer sequence between components A and B of the spectacle lens of the disclosure is provided.

If the functional layer $F_{RA}$ on the reverse face $R_{DA}$ of the ultrathin lens of component A comprises at least one coloring layer, this typically comprises a colorable layer according to U.S. Pat. No. 4,355,135 A, especially according to claim 1 of U.S. Pat. No. 4,355,135 A, according to U.S. Pat. No. 4,294,950 A, especially according to either of claims 1 and 6 of U.S. Pat. No. 4,294,950 A or according to U.S. Pat. No. 4,211,823 A, especially according to either of claims 1 and 2 of U.S. Pat. No. 4,211,823 A. More typically, the coloring layer comprises a colorable layer according to U.S. Pat. No. 4,355,135 A. The colorant usable for coloring may be selected, for example, from the group consisting of C.I. Disperse Yellow 5, C.I. Disperse Yellow 13, C.I. Disperse Yellow 33, C.I. Disperse Yellow 42, C.I. Disperse Yellow 51, C.I. Disperse Yellow 54, C.I. Disperse Yellow 64, C.I. Disperse Yellow 71, C.I. Disperse Yellow 86, C.I. Disperse Yellow 114, C.I. Disperse Yellow 201, C.I. Disperse Yellow 211, C.I. Disperse Orange 30, C.I. Disperse Orange 73, C.I. Disperse Red 4, C.I. Disperse Red 11, C.I. Disperse Red 15, C.I. Disperse Red 55, C.I. Disperse Red 58, C.I. Disperse Red 60, C.I. Disperse Red 73, C.I. Disperse Red 86, C.I. Disperse Red 91, C.I. Disperse Red 92, C.I. Disperse Red 127, C.I. Disperse Red 152, C.I. Disperse Red 189, C.I. Disperse Red 229, C.I. Disperse Red 279, C.I. Disperse Red 302, C.I. Disperse Red 302:1, C.I. Disperse Red 323, C.I. Disperse Blue 27, C.I. Disperse Blue 54, C.I. Disperse Blue 56, C.I. Disperse Blue 73, C.I. Disperse Blue 280, C.I. Disperse Violet 26, C.I. Disperse Violet 33, C.I. Solvent Yellow 179, C.I. Solvent Violet 36, C.I. Pigment Blue 15, C.I. Pigment Blue 80, C.I. Pigment Green 7, C.I. Pigment Orange 36, C.I. Pigment Orange 36, C.I. Pigment Yellow 13, C.I. Pigment Violet 23, C.I. Pigment Violet 37, C.I. Pigment Black 1, C.I. Pigment Black 6, and C.I. Pigment Black 7.

Alternatively, the coloring layer may also be applied by means of a printing ink, especially 3D printing ink, comprising a colorant.

If the functional layer $F_{RA}$ comprises at least one photochromic layer, it typically comprises a layer according to US 2006/0269741 A1, especially according to US 2006/0269741 A1, claim 6, or a layer according to US 2004/0220292 A1, especially according to US 2004/0220292 A1, claim 1. The photochromic layer typically has an average thickness from a range from 5 µm to 200 µm, further typically from a range from 9 µm to 166 µm, more typically from a range from 17 µm to 121 µm and most typically from a range from 21 µm to 81 µm.

If the functional layer $F_{RA}$ comprises at least one polarizing layer, the latter typically comprises either a polarization film or a layer having polarizing properties.

The polarization film used may be a film of polyvinyl alcohol or polyethylene terephthalate, for example, comprising dichroic colorants. The polarization film may have a monolayer or multilayer film structure. In one exemplary embodiment of the disclosure, the polarization film may have a multilayer structure comprising at least one film layer with dichroic colorants, at least one stabilizing film layer and at least one film layer with dichroic colorants or without dichroic colorants. In this exemplary embodiment, the film layer comprising dichroic colorants, just like the film layer without dichroic colorants, may in each case comprise, for example, a film layer of polyvinyl alcohol, polyvinyl formal, polyvinyl butyral or polyvinyl acetate. As an alternative to dichroic colorants, for example C.I. Direct Blue 67, C.I. Direct Blue 90, C.I. Direct Blue 200, C.I. Direct Green 59, C.I. Direct Violet 48, C.I. Direct Red 39, C.I. Direct Red 81, C.I. Direct Red 83, C.I. Direct Red 89, C.I. Direct Orange 39, C.I. Direct Orange 72, C.I. Direct Yellow 34, C.I. Direct Green 26, C.I. Direct Green 27, C.I. Direct Green 28, C.I. Direct Green 51, and/or C.I. Direct Black 170, it is also possible to use iodine. In this exemplary embodiment, the stabilizing film layer may comprise, for example, polyethylene terephthalate, polymethacrylate, polymethylmethacrylate, polycarbonate, cellulose acetate butyrate, and/or triacetylcellulose. In a further exemplary embodiment of the disclosure, the polarization film may have been preformed to exactly fit the reverse face of the ultrathin lens of component A. Typically, the polarization film is preformed with application of reduced pressure with the aid of a metal mold.

A layer having polarizing properties is disclosed, for example, in EP 1 965 235 A1, EP 0 217 502 A1, EP 1 674 898 A1, US 2006/0066947 A1, WO 2005/050265 A1, WO 2009/029198 A1, WO 2009/156784 A1, or WO 2015/160612 A1. In the aforementioned citations, the layer having polarizing properties is in each case a constituent of a layer sequence described therein. In the context of this disclosure, typically only the layer having polarizing properties which is described in the applications cited is used as polarizing layer. In one exemplary embodiment of the disclosure, the ultrathin lens of component A may be formed, for example, by means of a mold shell which leaves regular, typically linear, surface structuring on that surface of the ultrathin lens which has come into contact with the surface of the mold shell during the forming operation. This surface structuring can be utilized in that the dichroic colorants usable for production of the layer having polarizing properties fill this surface structuring and hence, by contrast with the application cited above, the step of microcrack formation necessary therein or the coating necessary for surface structuring is no longer necessary.

In a typical exemplary embodiment, the functional layer $F_{RA}$ comprises, as polarizing layer, a polarization film, typically a polarization film having a multilayer film structure.

If the functional layer $F_{RA}$ comprises at least one reflection layer, it typically comprises alternating dielectric layers in the manner of a Bragg mirror and/or at least one semitransparent metal layer. The reflection layer is typically a semitransparent metal layer. The at least one semitransparent metal layer may comprise, for example, an aluminum layer, chromium layer, gold layer, and/or silver layer. The layer thickness of the semitransparent metal layer is typically within a range from 4 nm to 48 nm, more typically within a range from 8 nm to 41 nm and most typically within a range from 17 nm to 33 nm. The at least one semitransparent metal layer is typically applied by means of a PVD method to the reverse face of the ultrathin lens $R_{DA}$ of component A.

In one exemplary embodiment of the disclosure, the reverse face of the ultrathin lens $R_{DA}$ of component A comprises a reflection layer as functional layer $F_{RA}$ and the front face of the ultrathin lens $V_{DA}$ of component A does not comprise an antireflection layer. In this exemplary embodiment, the spectacle lens of the disclosure may comprise an antireflection layer on the reverse face of the ultrathin lens $R_{DC}$ of component C or adjoining the functional layer $F_C$ of component C on the eye side. In this way, it can be ensured that fewer troublesome reflections from the eye-side reverse face of the spectacle lens of the disclosure reach the eye. Alternatively, the spectacle lens of the disclosure may comprise an antireflection layer and a clean-coat layer on the reverse face of the ultrathin lens $R_{DC}$ of component C or adjoining the functional layer $F_C$ of component C on the eye side, where the clean-coat layer is the closest layer on the eye side.

In a further exemplary embodiment of the disclosure, the reverse face of the ultrathin lens $R_{DA}$ of component A comprises a reflection layer as functional layer $F_{RA}$ and the front face of the ultrathin lens $V_{DA}$ of component A comprises a clean-coat layer. In this exemplary embodiment, the spectacle lens of the disclosure may comprise an antireflection layer or an antireflection layer and a clean-coat layer on the reverse face of the ultrathin lens $R_{DC}$ of component C or adjoining the functional layer $F_C$ of component C on the eye side, in which latter case the clean-coat layer is the outermost layer on the eye side.

In a typical exemplary embodiment of the disclosure, the reverse face of the ultrathin lens $R_{DA}$ of component A comprises exactly one type of functional layer $F_{RA}$, where the functional layer $F_{RA}$ may be selected from the group consisting of a coloring layer, photochromic layer, polarizing layer, and reflection layer.

In a further exemplary embodiment of the disclosure, the reverse face of the ultrathin lens $R_{DA}$ of component A comprises multiple types of functional layer $F_{RA}$, where the functional layer $F_{RA}$ may be selected from the group consisting of coloring layer, photochromic layer, polarizing layer and reflection layer. In this exemplary embodiment, it is typical when, in the spectacle lens of the disclosure, proceeding from the front face on the object side to the opposite eye-side reverse face, one of the following combinations of the functional layer $F_{RA}$ is present in the sequence specified between components A and B:

component A/photochromic layer/polarizing layer/coloring layer/component B,
component A/photochromic layer/coloring layer/polarizing layer/component B,
component A/photochromic layer/polarizing layer/reflection layer/component B,
component A/photochromic layer/reflection layer/polarizing layer/component B,
component A/photochromic layer/reflection layer/component B,
component A/reflection layer/polarizing layer/coloring layer/component B,
component A/polarizing layer/coloring layer/component B,
component A/reflection layer/polarizing layer/component B, or
component A/reflection layer/coloring layer/component B.

In one exemplary embodiment of the disclosure, the spectacle lens of the disclosure comprises components A, B, and C, where the ultrathin lens of component A does not have a functional layer $F_{RA}$ on the reverse face of the ultrathin lens $R_{DA}$. In this case, there may be no layers disposed between components A and B in the spectacle lens of the disclosure, and hence components A and B may be directly bonded to one another in a cohesive and/or form-fitting manner. Alternatively, component B may be a semifinished spectacle lens, the front face of which has been coated with at least one functional layer $F_{VB}$, in which case the outermost functional layer $F_{VB}$ of component B on the object side is bondable in a cohesive and/or form-fitting manner to the reverse face of the ultrathin lens $R_{DA}$.

If the individual components are processed and prepared separately from one another, a decision may be made beforehand as to what kind of layer is typically applied to A, B or C to assure optimal process conditions. For example, components A and/or C, if C is an ultrathin lens, may be processed using the vapor deposition parameters in the PVD process for the antireflection coating on mineral glasses. These parameters, which typically comprise the use of temperatures of greater than 200° C. to 800° C., as described, for example, in WO 98/45113 A1 or DE 10 2007 025 151 A, are not compatible with the polymeric materials of component B, and so the spectacle lens of the disclosure comprising components A, B, and C cannot be processed in this way.

In the context of this disclosure, "cohesive bonds" are understood to mean bonds that hold the respective components of the spectacle lens of the disclosure together, typically components A and B or components B and C or components A and C. The bonding of the individual components here may be direct, meaning that neither of the two components to be bonded has a functional layer on that surface which is to be bonded to the other component. Alternatively, at least one of the components may have been covered with at least one functional layer. In the latter case, the cohesive bond is via the outermost functional layer in each case that faces the surface of the component to be attached or its outermost functional layer.

In the context of this disclosure, "form-fitting bonds" are understood to mean bonds in which the individual components of the spectacle lens of the disclosure, typically components A and B or components B and C or components A and C, can be joined together with an exact fit. Functional layers disposed between components A and C generally have the same surface topography as the surface beneath in each case, and so functionally coated components are bondable in a form-fitting manner. Slight differences in the surface topography of the two surfaces to be joined to one another can be filled, for example, by means of an adhesive. In order to be able to bond the individual components of the spectacle lens of the disclosure to one another in a form-fitting manner, the radii of curvature of the respective components to be bonded to one another should typically differ by less than 1 mm, more typically within a range from 0.03 mm to ≤0.8 mm, even more typically within a range from 0.04 mm to ≤0.7 mm and most typically within a range from 0.05 mm to ≤0.6 mm.

Both cohesive and form-fitting bonds can be achieved, for example, by thermal treatment and/or by contact bonding and/or by means of an adhesive.

In one exemplary embodiment of the disclosure, the ultrathin lens of component A does not comprise any functional layer $F_{VA}$ on the front face of the ultrathin lens $V_{DA}$.

In a further exemplary embodiment of the disclosure, the ultrathin lens of component A comprises at least one functional layer $F_{VA}$ on the front face of the ultrathin lens $V_{DA}$ and no functional layer $F_{RA}$ on the reverse face of the ultrathin lens $R_{DA}$. In this exemplary embodiment, the at least one functional layer $F_{VA}$ is typically an antireflection layer or an antireflection layer and a clean-coat layer, in which latter case the clean-coat layer is the outer layer on the object side.

In a typical exemplary embodiment, the ultrathin lens of component A comprises at least one functional layer $F_{VA}$ on the front face of the ultrathin lens $V_{DA}$ and at least one functional layer $F_{RA}$ on the reverse face of the ultrathin lens $R_{DA}$. In this exemplary embodiment, the functional layer $F_{VA}$ typically comprises an antireflection layer and the functional layer $F_{RA}$ typically comprises a photochromic layer.

The coating of the ultrathin lens of component A with at least one functional layer $F_{VA}$ on the front face of the ultrathin lens $V_{DA}$ may either precede or follow the combining of component A with the remaining components of the spectacle lens of the disclosure, typically component B or components B and C. Typically, the front face of the ultrathin lens $V_{DA}$ of the spectacle lens of the disclosure, i.e., the spectacle lens comprising typically at least components A, B, and C, is coated with at least one functional layer $F_{VA}$.

Depending on the coating to be applied in each case, the coating of the front face and/or the reverse face of the ultrathin lens of component A may precede or follow any desired forming of the ultrathin lens. Typically, organic layers, for example a photochromic layer or an antifog layer, or a polarization film, are applied after the forming of the ultrathin lens, while inorganic layers, for example an antireflection layer or a reflection layer, may be applied before or after the forming of the ultrathin lens. Typically, inorganic functional layers $F_{VA}$ and/or $F_{RA}$ are applied to the ultrathin lens of component A after forming thereof. The above remarks are correspondingly applicable to the optionally present ultrathin lens of component C.

The ultrathin lens of component C may comprise at least one functional layer $F_{VC}$ on the front face of the ultrathin lens $V_{DC}$. The functional layer $F_{VC}$ may comprise a coloring layer, for example. In addition, the ultrathin lens of component C typically comprises at least one functional layer $F_{RC}$ on the reverse face of the ultrathin lens $R_{DC}$. The functional layer $F_{RC}$ may be at least one antireflection layer, at least one antifog layer, or at least one clean-coat layer. Typically, the functional layer $F_{RC}$ comprises at least one antireflection layer and at least one clean-coat layer, in which case the clean-coat layer is the outermost layer on the eye side of the spectacle lens of the disclosure. The above layers have already been described in detail in connection with the ultrathin lens of component A.

The front face and/or the reverse face of the ultrathin lens of component A or component C can each be coated by means of a PVD method and/or a spin-coating method. The subsequent curing of the coating obtained by the spin-coating method can be effected either thermally or by radiation curing. Typically, this coating is cured by radiation curing.

If the spectacle lenses of the disclosure comprise adjoining functional layers, it will be apparent to the person skilled in the art that these must be compatible with one another in order, for example, to prevent separation of the spectacle lens of the disclosure.

Component C of the spectacle lens of the disclosure may, additionally or alternatively to an ultrathin lens, comprise at least one functional layer $F_C$. In the absence of an ultrathin lens, the functional layer $F_C$ of component C is typically selected from the group consisting of at least one hard lacquer layer, typically a composition for the production of a coating having high bond strength and high scratch resistance, as described, for example, in EP 2 578 649 A1, especially in EP 2 578 649 A1, claim 1, at least one antireflection layer, at least one antifog layer, at least one clean-coat layer and at least one electrically conductive or semiconductive layer. Proceeding from the reverse face $R_B$ of the finished spectacle lens of component B, in the presence of multiple functional layers $F_C$, the coating sequence in the eye direction is as follows:

a) optionally at least one electrically conductive or semiconductive layer, b) at least one antireflection layer, and c) at least one antifog layer or at least one clean-coat layer.

In this case, the electrically conductive or semiconductive layer optionally present as functional layer $F_C$ may be a constituent of the antireflection layer.

In one exemplary embodiment of the disclosure, the spectacle lenses of the disclosure do not comprise any component B, but only comprise components A and C. In this exemplary embodiment, the spectacle lenses of the disclosure typically comprise an ultrathin lens as each of components A and C, where the ultrathin lens of component A and the ultrathin lens of component C are typically identical in relation to glass composition and shape. In this exemplary embodiment too, the front face of the ultrathin lens $V_{DA}$ of component A has typically been coated with at least one functional layer $F_{VA}$, and the reverse face of the ultrathin lens $R_{DA}$ of component A optionally with at least one functional layer $F_{RA}$. The front face of the ultrathin lens $V_{DC}$ of component C has optionally been coated with at least one functional layer $F_{VC}$, and the reverse face of the ultrathin lens $R_{DC}$ of component C typically with at least one functional layer $F_{RC}$. The functional layer $F_{RA}$ of the reverse face of the ultrathin lens $R_{DA}$ of component A or the functional layer $F_{VC}$ of the front face of the ultrathin lens $V_{DC}$ of component C may be selected from the group consisting of at least one coloring layer, at least one photochromic layer, at least one polarizing layer, and/or at least one reflection layer. In this exemplary embodiment, not all functional layers disposed between components A and C in the spectacle lens of the disclosure need be present as at least one functional layer $F_{RA}$ on the reverse face $R_{DA}$ of component A or as at least one functional layer $F_{VC}$ on the front face $V_{DC}$ of component C. The reverse face $R_{DA}$ of the ultrathin lens of component A and the front face $F_{VC}$ of the ultrathin lens of component C may, for example, each include some of the functional layers present in the spectacle lens of the disclosure comprising components A and C. For example, the functional layer $F_{RA}$ may comprise a photochromic layer and the functional layer $F_{VC}$ a polarizing layer. The at least one functional layer $F_{VA}$ on the front face of the ultrathin lens $V_{DA}$ of component A or the at least one functional layer $F_{RC}$ on the reverse face of the ultrathin lens $R_{DC}$ of component C may be at least one antireflection layer, at least one antifog layer, at least one electrically conductive or semiconductive layer, and/or at least one clean-coat layer. It is typical in this exemplary embodiment that the functional layer $F_{VA}$ on the front face of the ultrathin lens $V_{DA}$ of component A and the functional layer $F_{RC}$ on the reverse face of the ultrathin lens $R_{DC}$ of component C in each case comprise an antireflection layer and, as the respective outermost layer on the object side or eye side, a clean-coat layer. In this exemplary embodiment, components A and C are typically bonded to one another in a cohesive and form-fitting manner. In order to assure an increase in mechanical stability, and/or to take account of different radii of curvature of the ultrathin lenses of components A and C, in this exemplary embodiment, an adhesive may be added between components A and C. With regard to the different radii of curvature of components A and C, the details given above are applicable, i.e., the radii of curvature should differ by less than 1 mm, further typically within a range from 0.03 mm to ≤0.8 mm, more typically within a range from 0.04 mm to ≤0.7 mm, and most typically within a range from 0.05 mm to ≤0.6 mm. In addition, different surface topographies of the ultrathin lenses of components A and C or of the functional layers $F_{RA}$ or $F_{VC}$ optionally present thereon may be filled by means of an adhesive. The surface topography of the functional layers $F_{RA}$ or $F_{VC}$ is typically matched to the surface topography of the reverse face of the ultrathin lens $R_{DA}$ of component A or the front face of the ultrathin lens $V_{DC}$ of component C.

Component B of the spectacle lens of the disclosure comprises at least one polymeric material and/or at least one mineral glass.

The polymeric material or the mineral glass may each take the form of a semifinished spectacle lens, i.e., of a lens blank having just one optically ready-processed face according to DIN EN ISO 13666:2013-10, paragraph 8.4.2, or of a finished spectacle lens, i.e., of a spectacle lens having two ready-processed optical faces before or after edge processing according to DIN EN ISO 13666:2013-10, paragraph 8.4.6. The semifinished spectacle lenses may take the form of monofocal semifinished spectacle lenses, multifocal semifinished spectacle lenses or varifocal semifinished spectacle lenses according to DIN EN ISO 13666:2013-10, paragraphs 8.4.3, 8.4.4 and 8.4.5. The finished spectacle lenses may be monofocal spectacle lenses, multifocal spectacle lenses, bifocal spectacle lenses, trifocal spectacle lenses, varifocal spectacle lenses or degressive spectacle lenses according to DIN EN ISO 13666:2013-10, paragraphs 8.3.1, 8.3.2, 8.3.3, 8.3.4, 8.3.5, and 8.3.6. The semifinished spectacle lenses or finished spectacle lenses usable as substrate may be based, for example on the base materials specified in Table 1 below.

TABLE 1

Examples of base materials of semifinished spectacle lenses or finished spectacle lenses

| Trade name | Base material | Average refractive index n* | Abbe number v* |
|---|---|---|---|
| CR 39, CR 330, CR 607, CR 630, RAV 700, 7NG, 7AT, 710, 713, 720 | Polyallyldiglycol carbonate ((P)ADC) | 1.500 | 56 |
| RAVolution | Polyurea/ Polyurethane | 1.500 | 54 |
| Trivex | Polyurea/ Polyurethane | 1.530 | 45 |
| Panlite, Lexan | Polycarbonate (PC) | 1.590 | 29 |
| MR 6 | Polythiourethane | 1.598 | |
| MR 8 | Polythiourethane | 1.598 | 41 |
| MR 7 | Polythiourethane | 1.664 | 32 |
| MR 10 | Polythiourethane | 1.666 | 32 |
| MR 174 | Polyepisulfide | 1.738 | 32 |
| MGC 1.76 | Polyepisulfide | 1.76 | 30 |
| | Mineral 1.5 | 1.525 | 58 |
| | Mineral 1.6 | 1.604 | 44 |
| | Mineral 1.7 | 1.701 | 39.2 |
| | Mineral 1.8 | 1.802 | 34.4 |
| | Mineral 1.9 | 1.885 | 30 |

*Based on sodium D line

The opposite face of the semifinished spectacle lens from the optically ready-processed face may, before or after the coating of the optically ready-processed face of the semifinished spectacle lens, typically be converted by mechanical processing, for example machining and/or grinding and/or turning and/or polishing, to the second optically ready-processed face. This mechanical processing typically precedes the coating of the semifinished spectacle lens.

The semifinished spectacle lens or the finished spectacle lens may each have no optical correction effect. Alternatively, the semifinished spectacle lens or the finished spectacle lens may be equipped with an optical correction effect and/or an aberration correction for the viewing eye. Optical correction effect is understood to mean spherical correction, astigmatic correction, and correction of the axis position and optionally correction by a prism with a base setting. This optical correction effect is conventionally implemented for distance vision in monofocal spectacle lenses. In the case of multifocal spectacle lenses, bifocal spectacle lenses, trifocal spectacle lenses, varifocal spectacle lenses, or degressive spectacle lenses, the optical correction effect for distance vision and/or for close vision may in each case include a spherical correction, an astigmatic correction, a correction of the axis position, and optionally a correction by a prism with a base setting. Aberration correction for the viewing eye, regardless of whether the aberration correction is for close vision or distance vision, is typically calculated analogously to Werner Köppen "Konzeption and Entwicklung von Gleitsichtgläsern" [Design and Development of Varifocal Lenses], Deutsche Optiker Zeitschrift DOZ, October 1995, pages 42-45.

If component B as polymeric material comprises at least one polymer film, the latter is typically based on polyethylene, polypropylene, polyethylene terephthalate, polycarbonate, polymethylmethacrylate, polyvinyl chloride, polyvinyl acetate, polyvinyl butyrate, and/or mixtures thereof. The at least one polymer film may have been stabilized with cellulose triacetate, for example. The at least one polymer film may be colored or uncolored. If the substrate to be coated that comprises at least a polymer film and at least an ultrathin lens is to be colored, the at least one polymer film is typically colored. The at least one polymer film typically has an average thickness within a range from 9 μm to 205 μm, more typically within a range from 14 μm to 103 μm. Typically, the at least one polymer film has a diameter sufficiently great that the at least one polymer film completely covers the front face of the eye-side ultrathin lens and the reverse face of the object-side ultrathin lens. Any excess polymer film is typically cut off. If the at least one polymer film already has the same radius of curvature as the ultrathin lens to be bonded thereto, the at least one polymer film typically has the same diameter as the ultrathin lens. Typically, the polymer film is bonded to at least one ultrathin lens by means of an adhesive. The adhesive usable is described hereinafter.

The use of the at least one ultrathin lens, even in the case of use of a component B having a low refractive index, enables spectacle lenses of the disclosure that have significantly lower middle thickness than would be possible with a polymeric material of the same refractive index or even in some cases with a polymeric material of higher refractive index.

The at least one ultrathin lens, by virtue of its low average thickness, has no significant effect on the average thickness and edge thickness of the spectacle lens of the disclosure.

The drastic reduction in middle thickness implemented in the spectacle lens of the disclosure also reduces the edge thickness thereof. This is advantageous from a cosmetic point of view especially in the case of minus lenses because it has an unattractive appearance to an observer if a spectacle lens does not disappear completely in the spectacle frame.

For the production of a spectacle lens of the disclosure comprising components A, B, and C, in this exemplary embodiment, the reverse face of the ultrathin lens $R_{DA}$ of component A is joined to the front face $V_B$ of component B. If component C comprises an ultrathin lens, the reverse face $R_B$ of component B is joined to the front face of the ultrathin lens $V_{DC}$ of component C. Alternatively, if component C comprises at least one functional layer $F_C$, the reverse face $R_B$ of component B is coated therewith. In the absence of component B, the reverse face of the ultrathin lens $R_{DA}$ of component A is joined to the front face of the ultrathin lens $V_{DC}$ of component C.

The individual components of the spectacle lens of the disclosure are joined, for example, by means of an adhesive or a bonding method. Typically, the individual components of the spectacle lens of the disclosure are joined by means of an adhesive. The adhesive may serve here, for example, as primer or compensation material for the different thermal expansion of the individual components. In addition, via the selection of the adhesive, matching of any difference in refractive index $\Delta n_D$ that exists between the individual components can be achieved. What is typically effected here is not just the matching of the refractive index $n_D$ but also the matching of the Abbe number, such that the change in the refractive index of the individual components is the same across the visible spectrum. The adhesive usable in the spectacle lens of the disclosure can be found, for example, in DE 10 2012 210 185 A1, WO 2009/056196 A1, or WO 2015/121341 A1. Typically, the individual components of the spectacle lens of the disclosure are bonded to one another by means of an adhesive based on an amine-catalyzed thiol hardening of epoxy resins analogously to WO 2015/121341 A1, especially analogously to claim 1 of WO 2015/121341 A1, at a temperature within a range from 20° C. to 80° C., typically from a range from 40° C. to 70° C. and more typically within a range from 45° C. to 65° C.

In one exemplary embodiment of the disclosure, components A, B, and C, if component C is an ultrathin lens, have the same diameter prior to joining by means of an adhesive.

The surface topography of a functional layer is typically matched to the surface topography of the front face or reverse face that has been respectively coated therewith of one of the components of the spectacle lens of the disclosure. "Matched" is understood here to mean that the two surface topographies are essentially the same or the differences are so small that they can be filled with one of the adhesives listed above.

It will also be apparent to the person skilled in the art in this connection that the functional layer(s) optionally present in each case at the interfaces between components A and B or B and C of the spectacle lens of the disclosure should be taken into account as well in the selection of a suitable adhesive.

If a spectacle lens comprising components A, B, and C is produced using a semifinished spectacle lens as component B, the optically effective target face of the semifinished spectacle lens is typically bondable in a cohesive and form-fitting manner either to the reverse face of the ultrathin lens of component A or optionally to the front face of the ultrathin lens of component C. Possible surface topographies of an optically effective target surface of the front face $V_B$ or of the reverse face $R_B$ of component B and the respectively fitting surface topographies of the ultrathin lenses of components A and C, if component C comprises an ultrathin lens, can be found in Table 2. In this exemplary embodiment, the opposite face from the optically effective target face of the semifinished spectacle lens may first likewise be converted to an optically effective target face and the resulting component B may be bonded, in each case typically in a cohesive and/or form-fitting manner, to the ultrathin lens of component A and optionally of component C. Rather than the ultrathin lens of component C, the reverse face of component B can also be coated with a functional layer $F_C$. Typically, in the case of use of a semifinished spectacle lens, the front face $V_B$ of component B is the optically effective target face. An alternative mode of production of the spectacle lens of the disclosure by means of a semifinished spectacle lens comprises the typically cohesive and/or form-fitting bonding of the optically effective target face of the semifinished spectacle lens to one of the ultrathin lenses of components A and C. Typically, bonding the optically effective front face $V_B$ of the semifinished spectacle lens of component B to the reverse face $R_{DA}$ of the ultrathin lens of component A takes place in a cohesive and form-fitting manner. This composite permits, for the processing of the reverse face $R_B$, a low minimum thickness of component B without impairing the stability thereof. After processing of the reverse face has ended, this can either be bonded to the front face of the ultrathin lens $V_{DC}$ of component C, typically in a cohesive and/or form-fitting manner, or coated with a functional layer $F_C$. The typically cohesive and/or form-fitting bonding can be effected by means of an adhesive, by means of a bonding method or by means of contact bonding. Typically, the bonding of the individual components is achieved by means of an adhesive. Small differences in surface topography and/or different thermal expansion can be filled or compensated for by means of an adhesive. Typically, a spectacle lens of the disclosure is produced with the aid of a semifinished spectacle lens via the last method presented. It is of course possible for the individual components of the spectacle lens of the disclosure to be covered by at least one of the functional layers already described in detail prior to the joining. The separate coating or separate preparation of the individual components has the advantage that the process conditions can be optimally tailored to the respective component. If the spectacle lens of the disclosure comprises further components, the above remarks in relation to components A, B, and C are correspondingly applicable.

Table 2 below gives, by way of example, an overview of the possible surface topographies of the front faces or of the reverse faces of components A, B, and C of the spectacle lens of the disclosure if component C comprises an ultrathin lens and component B a finished spectacle lens. Table 2 does not distinguish between the front face and reverse face of the respective ultrathin lens of component A or C since the differences in surface topography caused by any preceding forming process are typically negligible. Moreover, the illustrative overview of surface topographies does not make separate mention of functional layers that are optionally present because the individual functional layers are typically matched to the surface topography of the component respectively coated therewith and hence are typically likewise negligible in this connection.

TABLE 2

Possible surface topographies of components A, B, and C

| Component A | Comp. B, front face $V_B$ | Comp. B, reverse face $R_B$ | Component C |
|---|---|---|---|
| spherical[1] | spherical | spherical | spherical |
| spherical | spherical | planar | planar |
| planar | planar | spherical | spherical |
| planar[1] | planar | planar | planar |
| aspherical[1] | aspherical | aspherical | aspherical |
| aspherical | aspherical | planar | planar |
| planar | planar | aspherical | aspherical |
| spherical | spherical | aspherical | aspherical |
| aspherical | aspherical | spherical | spherical |
| spherical | spherical | toric[1] | toric |
| toric | toric | spherical | spherical |
| toric | toric | toric | toric |
| aspherical | aspherical | toric | toric |
| toric | toric | aspherical | aspherical |
| toric | toric | planar | planar |
| planar | planar | toric | toric |
| spherical | spherical | atoric[1] | atoric |
| atoric | atoric | spherical | spherical |
| atoric | atoric | atoric | atoric |
| aspherical | aspherical | atoric | atoric |
| atoric | atoric | aspherical | aspherical |
| atoric | atoric | planar | planar |
| planar | planar | atoric | atoric |
| toric | toric | atoric | atoric |
| atoric | atoric | toric | toric |

[1])A spherical, aspherical, toric or atoric surface topography may in each case have a convex or concave configuration. When the individual components of the spectacle lens of the disclosure are joined, typically in each case exclusively concave or in each case exclusively convex components are used.

In one exemplary embodiment of the disclosure, as apparent from Table 2 above, if component C comprises an ultrathin lens and component B a finished spectacle lens, the surface topography at the respective interface of component A to B or B to C may be mutually fitting, such that the individual components of the spectacle lens of the disclosure are typically bondable to one another in a cohesive and/or form-fitting manner. "Mutually fitting" means here that the respective interfaces can be joined with an exact fit or that slight differences in surface topography can be filled by means of an adhesive. The surface topography of the ultrathin lens of components A and C may be the same or different.

In one exemplary embodiment of the disclosure, the front faces and the reverse faces of components A, B, and C of the spectacle lens of the disclosure may each have an identical surface topography as listed by way of example in Table 2. If the front faces and the reverse faces of components A, B, and C are each in spherical form, for example, these may each have identical radii of curvature and diameters, such that components A and B and components B and C can each be joined in a cohesive and form-fitting manner, for example by means of an adhesive, a bonding method, or by contact bonding. Typically, the joining of the individual components of the spectacle lens of the disclosure is performed by means of an adhesive, more typically by means of an adhesive based on amine-catalyzed thiol hardening of epoxy resins according to WO 2015/121341 A1. If the front faces and the reverse faces of components A, B, and C are each in spherical form but do not have identical radii of curvature at the interface between components A and B and/or at the interface between components B and C, the cavities that result from the differences in curvature on joining of the individual components are typically filled by means of an adhesive. For filling of cavities as well, typically an adhesive based on amine-catalyzed thiol hardening of epoxy resins according to WO 2015/121341 A1 is used. Typically, non-identical radii of curvature of the individual components differ by less than 1 mm, more typically within a range from 0.03 mm to ≤0.8 mm, even more typically within a range from 0.04 mm to ≤0.7 mm, and most typically within a range from 0.05 mm to ≤0.6 mm. Slight deviations in the radii of curvature can be exploited in that any air pockets that occur in the adhesive during the joining can be removed by simple pressing of the ultrathin lens of component A and/or C in the direction of the cylinder edge face of the semifinished spectacle lens or finished spectacle lens of component B. If the interfaces of components A, B, and C are each in planar form, these may likewise be joined in a cohesive and form-fitting manner, for example by means of an adhesive or a bonding method.

In a further exemplary embodiment of the disclosure, the spectacle lenses of the disclosure may have either no dioptric power or at least one dioptric power implemented in the finished spectacle lens, optionally including the ultrathin lens of component A or the ultrathin lenses of components A and C. Spectacle lenses of the disclosure having above-described surface topographies and simultaneously at least one dioptric power, i.e., in the form of a monofocal spectacle lens or of a multifocal spectacle lens, can also be implemented, for example, by means of a component B having a calculated location-dependent refractive index distribution.

In one exemplary embodiment of the disclosure, at least components A, B, and C, if component C is an ultrathin lens, of the spectacle lens of the disclosure can be joined by means of a bonding method. The bonding method can be employed alternatively or additionally to an adhesive or to the contact bonding for joining of the individual components of the spectacle lens of the disclosure. One way of using the bonding method is in connection with semifinished spectacle lenses and finished spectacle lenses as component B. Alternatively, it is also possible to use multiple methods for joining of a spectacle lens of the disclosure. For example, components A and B can be joined by means of a bonding method, and components B and C by means of an adhesive. In the bonding method, at least one side of the finished spectacle lens or the optically effective target face of the semifinished spectacle lens is employed for shaping of the ultrathin lens that is to be bonded to precisely that shaping face. For this purpose, the ultrathin lens of component A or the ultrathin lens of component C is heated typically up to the transformation temperature $T_G$ of the respective ultrathin lens, typically under a protective gas atmosphere, and contacted with the front face or reverse face of component B to be bonded in each case, for example by pressing the front face of the reverse face of component B into the heated ultrathin lens. Component B serves here firstly as a mold shell for forming of the ultrathin lens; secondly, there is no need to use an adhesive in the bonding method. When the bonding method is used, it is apparent to the person skilled in the art that the process conditions for semifinished spectacle lenses or finished spectacle lenses of component B based on mineral glass and semifinished spectacle lenses or finished spectacle lenses of component B based on organic minerals have to be appropriately matched. Semifinished spectacle lenses or finished spectacle lenses of component B based on mineral glass may have a higher transformation temperature $T_G$ than the ultrathin lens of components A and optionally C to be bonded, and so, in the bonding method, less attention has to be paid here to the thermal stability of the at least one optically effective target face of component B itself than to optionally at least one functional layer applied to component B, and hence the process conditions have to be adjusted appropriately. Semifinished spectacle lenses or finished spectacle lenses of component B based on organic materials generally have a much lower transformation temperature $T_G$ than the ultrathin lens of component A and optionally of component C to be bonded. In this case, the bonding method has to be matched both to the thermal stability of component B and to the thermal stability of a coating optionally present on component B. This can be achieved, for example, by keeping the thermal stress on component B to a minimum by subjecting component B to a region that serves for heating of the ultrathin lens, for example an oven, for a very short period, typically less than 5 seconds, more typically less than 2 seconds. This brief thermal stress on component B does not bring about any change in the optically effective target face since the heat capacity of the ultrathin lens, in view of its small mass, is low compared to the mass of component B. Thermally sensitive functional layers of component B can be protected, for example, with a more thermally stable protective layer. This may involve, for example, a coating composition as disclosed, for example, in EP 2 578 649 A1, especially in EP 2 578 649 A1, claim 1, or a metal oxide, metal hydroxide, and/or metal oxide hydrate layer. The protective layer may also serve as a primer to compensate for differences in expansion.

The above remarks relating to the joining of components A, B, and C with a finished spectacle lens as component B may be applied correspondingly to the presence of further components in the spectacle lens of the disclosure.

In a further exemplary embodiment, the ultrathin lenses of components A and C may be contact-bonded to a finished spectacle lens by simply bringing them together. In this way, a stable bond can be achieved without adhesive or prior heating. A prerequisite for this is that the ultrathin lenses of components A and C and the finished spectacle lens of component B have an identical radius of curvature. In this connection, an identical radius of curvature tolerates differences in the sub-millimeter range.

In one exemplary embodiment of the disclosure, the semifinished spectacle lens or the finished spectacle lens of component B may be colored or uncolored. In addition, the semifinished spectacle lens or the finished spectacle lens of component B may comprise, for example, a polarizing film.

In a typical exemplary embodiment of the disclosure, the semifinished spectacle lens or the finished spectacle lens of component B is uncolored.

In a further typical exemplary embodiment, the semifinished spectacle lens of component B comprises at least one functional layer on the optically effective target face and the finished spectacle lens of component B comprises at least one functional layer $F_{VB}$ on the front face $V_B$ and at least one functional layer $F_{RB}$ on the reverse face $R_B$. Depending on the optically effective target face of the semifinished spectacle lens, the respective functional layer may be the layers specified for the finished spectacle lens hereinafter. The at least one functional layer $F_{VB}$ used may be any of those functional layers $F_{RA}$ that can be used on the reverse face $R_{DA}$ of the ultrathin lens of component A, meaning that the functional layer $F_{VB}$ may be selected from the group consisting of coloring layer, photochromic layer, polarizing layer, and reflection layer. The functional layers $F_{RA}$ have already been described in detail above. In relation to the typical layer sequence between components A and B of the spectacle lens of the disclosure as well, the statements already made above are applicable. If the front face $V_B$ of the semifinished spectacle lens or of the finished spectacle lens has been coated with at least one functional layer $F_{VB}$, one possible exemplary embodiment is that the reverse face $R_{DA}$ of the ultrathin lens of component A does not have a functional layer $F_{RA}$, or the front face $V_B$ and the reverse face $R_{DA}$ may each include some of the functional layers present between components A and B in the spectacle lens of the disclosure. If the semifinished spectacle lens or the finished spectacle lens of component B is based on an organic material, coating of the reverse face $R_{DA}$ of the ultrathin lens of component A holds the particular advantage that the coating conditions for the ultrathin lens can be optimized without having to take account of the more thermally sensitive organic material. By contrast, the coating of the front face $V_B$ of the semifinished spectacle lens or of the finished spectacle lens of component B with at least one functional layer $F_{VB}$ has the advantage that it is possible to use conventional standard coating processes for spectacle lenses based on polymeric materials in conventional standard coating systems without having to take special precautions for the more fracture-sensitive ultrathin lens of component A. The at least one functional layer $F_{RB}$ on the reverse face $R_B$ of the finished spectacle lens of component B, just like the functional layer $F_{VC}$ for coating of the front face $V_{DC}$ of the ultrathin lens of component C, may be a coloring layer. In the case of the at least one functional layer present between components B and C in the spectacle lens of the disclosure as well, it is possible to coat either the reverse face $R_B$ of the finished spectacle lens of component B or the front face $V_{DC}$ of the ultrathin lens of component C. The considerations made above in connection with the coating between components A and C of the spectacle lens of the disclosure are also applicable here to the selection of the component to be coated. If the spectacle lens of the disclosure does not comprise any ultrathin lens as component C, the reverse face $R_B$ of the finished spectacle lens may alternatively also be coated with at least one functional layer $F_C$ as component C. The functional layer $F_C$ of component C may be selected, for example, from the group consisting of at least one composition for the production of a coating having high bond strength and high scratch resistance, as described, for example, in EP 2 578 649 A1, especially in claim 1 of EP 2 578 649 A1, at least one antireflection layer, at least one antifog layer, at least one clean-coat layer, and at least one electrically conductive or semiconductive layer. Proceeding from the reverse face $R_B$ of the finished spectacle lens of component B, in the presence of multiple layers, the coating sequence in the eye direction is as follows:

a) Optionally, at least one electrically conductive or semiconductive layer,
b) at least one antireflection layer, and
c) at least one antifog layer or at least one clean-coat layer.

The electrically conductive or semiconductive layer optionally present as functional layer $F_C$ may be a constituent of the antireflection layer.

In a typical exemplary embodiment of the disclosure, in the production of a spectacle lens of the disclosure comprising at least components A, B, and C using a semifinished spectacle lens or a finished spectacle lens as component B, the latter is coated on the front face $V_B$ and/or on the reverse face $R_B$. This component B is then joined to an ultrathin lens of component A uncoated on the reverse face $R_{DA}$ and optionally to an ultrathin lens of component C uncoated on the front face $V_{DA}$. Alternatively, the reverse face $R_B$ of the semifinished spectacle lens, if it is optically effective, or the reverse face $R_B$ of the finished spectacle lens may be coated with at least one functional layer $F_C$. Useful functional layers $F_C$ here typically include the above-described layers in the sequence specified there. If components A and C of the spectacle lens of the disclosure are each an ultrathin lens, the front face $V_{DA}$ of the ultrathin lens of component A and reverse face $R_{DC}$ of the ultrathin lens of component C may each be covered with at least one functional layer $F_{VA}$ or $F_{RC}$. The functional layer $F_{VA}$ or the functional layer $F_{RC}$ may in each case be selected from the group consisting of at least one antireflection layer, at least one antifog layer, at least one electrically conductive or semiconductive layer, and at least one clean-coat layer. Proceeding from the front face $V_{DA}$ of the ultrathin lens of component A in the object direction or proceeding from the reverse face $R_{DC}$ of the ultrathin lens of component C in the eye direction, the coating sequence is typically in each case as follows:
 a) Optionally, at least one electrically conductive or semiconductive layer,
 b) at least one antireflection layer, and
 c) at least one antifog layer or at least one clean-coat layer.

The optionally present electrically conductive or semiconductive layer may be present as a constituent of the antireflection layer. The at least one functional layer $F_{VA}$ and the at least one functional layer $F_{RC}$ may each be identical, but need not be, meaning that the front face $V_{DA}$ of the ultrathin lens of component A and the reverse face $R_{DC}$ of the ultrathin lens of component C may be covered with different functional layers. Typically, the at least one functional layer $F_{VA}$ on the front face $V_{DA}$ of the ultrathin lens of component A and the at least one functional layer $F_{RC}$ on the reverse face $R_{DC}$ of the ultrathin lens of component C and, in the respective presence of multiple functional layers, the respective sequence thereof proceeding from the respective surface of the ultrathin lens are identical. Alternatively, the front face $V_{DA}$ of the ultrathin lens of component A and/or the reverse face $R_{DC}$ of the ultrathin lens of component C may have been provided with at least one antireflection layer, where the antireflection layers may be of identical or different construction.

The use of at least one ultrathin lens having the average thickness mentioned below offers the advantage with regard to the edging that the at least one ultrathin lens does not separate from component B, nor is any flaking or cracking in the ultrathin lens observed.

BRIEF DESCRIPTION OF THE DRAWINGS

The disclosure will now be described with reference to the drawings wherein.

DESCRIPTION OF EXEMPLARY EMBODIMENTS

Figure 1:
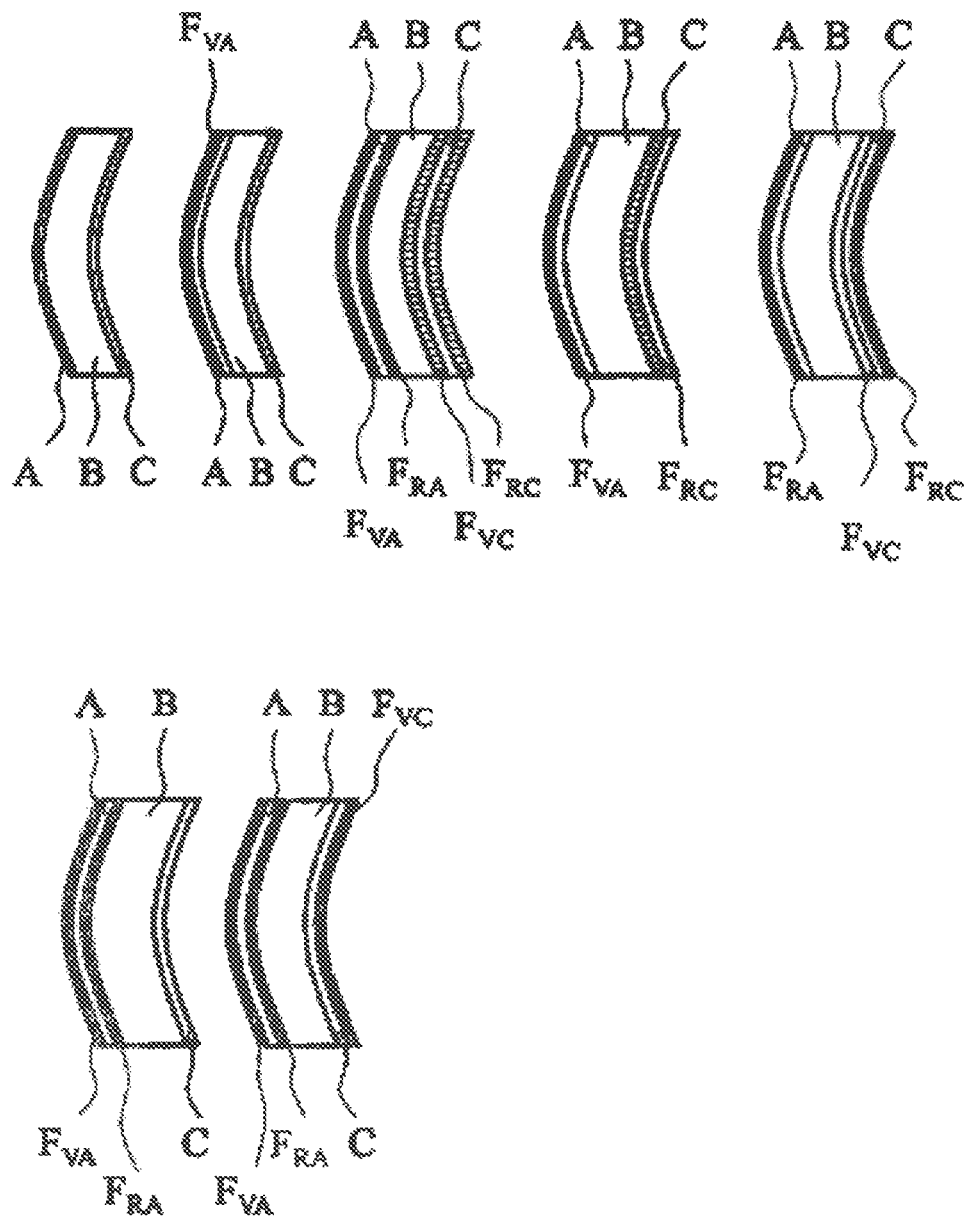
FIG. 1 shows possible exemplary embodiments of coatings of the spectacle lens of the disclosure.
Figure 2:
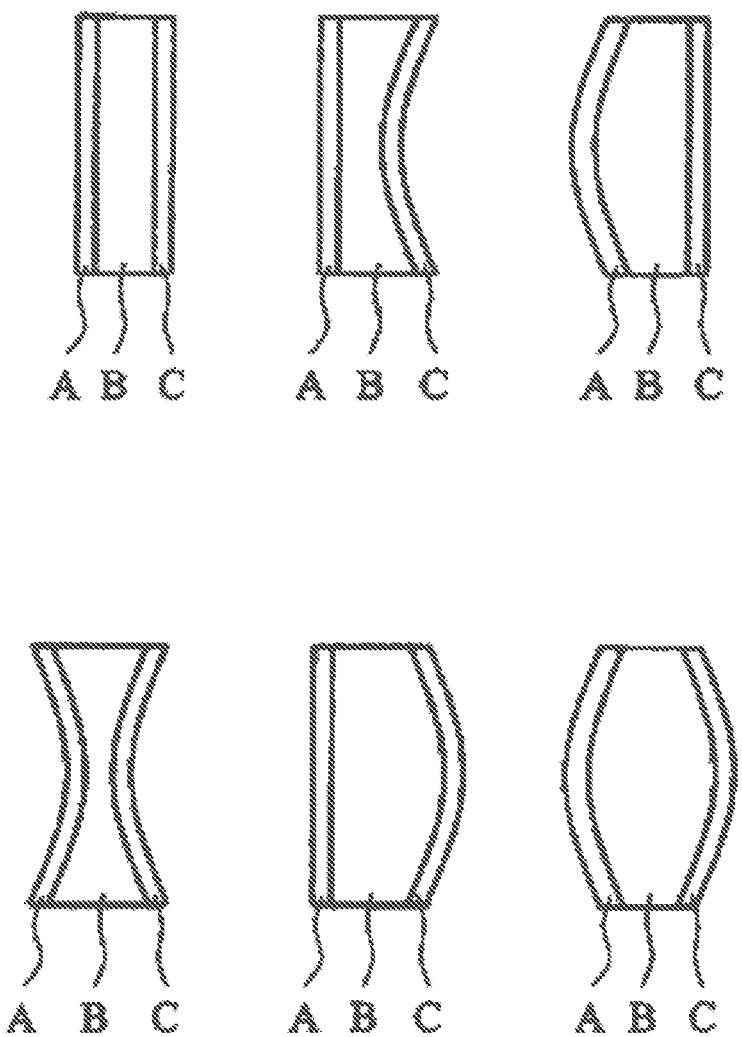
FIG. 2 shows possible surface topographies of the spectacle lens of the disclosure.

There follows a detailed elucidation of the disclosure by some examples, but these do not restrict the disclosure.

I Production of the Spectacle Lenses of the Disclosure

Examples 1 to 11 i) A semifinished spectacle lens based on polyallyldiglycol carbonate (CR 39, from PPG Industries, Inc.) having a front-face curvature of 123.50 mm was adjusted to an optical strength of −2.00 dpt by means of abrasive processing on the reverse face $R_B$ of the semifinished spectacle lens. 500 µL of the adhesive according to example 2 of WO 2015/121341 A1 were applied to the middle of the front face and then the ultrathin lens formed by means of a ceramic mold (ultrathin lens prior to forming: D 263® T eco, from Schott AG) having a radius of curvature of 123.50 mm was pressed on manually with the aid of a centering machine, such that the adhesive was distributed uniformly between the convex front face $V_B$ of the spectacle lens and the concave reverse face $R_B$ of the ultrathin lens. To cure the adhesive, the spectacle lens comprising components A and B was cured with a Hönle UV-LED source at 25° C. for 40 sec.

| Example | Middle thickness of spectacle lens [mm] | Average thickness of ultrathin lens [µm] |
|---|---|---|
| 1 | 2.39 | 210 |
| 2 | 2.22 | 100 |
| 3 | 1.84 | 100 |
| 4 | 1.66 | 100 |
| 5 | 1.58 | 100 |
| 6 | 1.13 | 100 |
| 7 | 1.00 | 100 |
| 8 | 0.70 | 100 |
| 9 | 0.59 | 100 |
| 10 | 0.47 | 100 |
| 11 | 0.41 | 100 |

Examples 12 to 14

A semifinished spectacle lens based on polyallyldiglycol carbonate (CR 39, from PPG Industries, Inc.) having a front-face curvature of 123.50 mm was adjusted to an optical strength of −2.00 dpt by means of abrasive processing on the reverse face $R_B$ of the semifinished spectacle lens. A hard lacquer layer according to example 2 of EP 2 578 649 A1 was applied on the reverse face $R_B$ via spin-coating, which was cured at 120° C. for three hours. 500 µL of the adhesive according to example 2 of WO 2015/121341 A1 were applied to the middle of the front face and then the ultrathin lens formed by means of a ceramic mold (ultrathin lens prior to forming: D 263® T eco, from Schott AG) having a radius of curvature of 123.50 mm was pressed on manually with the aid of a centering machine, such that the adhesive was distributed uniformly between the convex front face $V_B$ of the spectacle lens and the concave reverse face $R_B$ of the ultrathin lens. To cure the adhesive, the spectacle lens comprising components A and B was cured with a Hönle UV-LED source at 25° C. for 40 sec.

| Example | Middle thickness of the spectacle lens [mm] | Average thickness of ultrathin lens [µm] |
|---------|---------------------------------------------|------------------------------------------|
| 12 | 1.73 | 210 |
| 13 | 1.54 | 210 |
| 14 | 1.28 | 210 |

Examples 15 to 16

A semifinished spectacle lens based on polyallyldiglycol carbonate (CR 39, from PPG Industries, Inc.) having a front-face curvature of 123.50 mm was adjusted to an optical strength of −2.00 dpt by means of abrasive processing on the reverse face $R_B$ of the semifinished spectacle lens. Thereafter, a hard lacquer layer according to example 2 of EP 2 578 649 A1 is applied to the spectacle lens by a dipping method, and is cured at 120° C. for three hours. The reverse face was subjected to vapor deposition of an antireflection layer (DuraVision Platinum, from ZEISS) and then of the clean-coat layer (AFP 3000+, from Cotec GmbH), each by means of a PVD method. 500 µL of the adhesive according to example 2 of WO 2015/121341 A1 were applied to the middle of the front face and then the ultrathin lens formed by means of a ceramic mold (ultrathin lens prior to forming: D 263® T eco, from Schott AG) having a radius of curvature of 123.50 mm was pressed on manually with the aid of a centering machine, such that the adhesive was distributed uniformly between the convex front face $V_B$ of the spectacle lens and the concave reverse face $R_B$ of the ultrathin lens. To cure the adhesive, the spectacle lens comprising components A and B was cured with a Hönle UV-LED source at 25° C. for 40 sec. The front face was subjected to vapor deposition of an antireflection layer (DuraVision Platinum, from ZEISS) and then of the clean-coat layer (AFP 3000+, from Cotec GmbH), each by means of a PVD method.

| Example | Middle thickness of the spectacle lens [mm] | Average thickness of ultrathin lens [µm] |
|---------|---------------------------------------------|------------------------------------------|
| 15 | 1.97 | 210 |
| 16 | 1.65 | 210 |

Examples 17 and 18

A semifinished spectacle lens based on polyallyldiglycol carbonate (CR 39, from PPG Industries, Inc.) having a front-face curvature of 123.50 mm was adjusted to an optical strength of −2.00 dpt by means of abrasive processing on the reverse face $R_B$ of the semifinished spectacle lens. Thereafter, a hard lacquer layer according to example 2 of EP 2 578 649 A1 was applied to the spectacle lens by a dipping method, and cured at 120° C. for three hours. The reverse face was subjected to vapor deposition of an antireflection layer (DuraVision Platinum, from ZEISS) and then of the clean-coat layer (AFP 3000+, from Cotec GmbH), each by means of a PVD method. 500 µL of the adhesive according to example 2 of WO 2015/121341 A1 were applied to the middle of the front face and then the ultrathin lens formed by means of a ceramic mold (ultrathin lens prior to forming: D 263® T eco, from Schott AG) having a radius of curvature of 123.50 mm was pressed on manually with the aid of a centering machine, such that the adhesive was distributed uniformly between the convex front face $V_B$ of the spectacle lens and the concave reverse face $R_B$ of the ultrathin lens. To cure the adhesive, the spectacle lens comprising components A and B was cured with a Hönle UV-LED source at 25° C. for 40 sec.

| Example | Middle thickness of the spectacle lens [mm] | Average thickness of ultrathin lens [µm] |
|---------|---------------------------------------------|------------------------------------------|
| 17 | 2.02 | 210 |
| 18 | 1.66 | 210 |

Comparative Examples 1 to 3

A semifinished spectacle lens based on polyallyldiglycol carbonate (CR 39, from PPG Industries, Inc.) having a front-face curvature of 123.50 mm was adjusted to an optical strength of −2.00 dpt by means of abrasive processing on the reverse face $R_B$ of the semifinished spectacle lens. Thereafter, a hard lacquer layer according to example 2 of EP 2 578 649 A1 was applied to the spectacle lens by a dipping method, and cured at 120° C. for three hours. The front and reverse faces were subjected to vapor deposition of an antireflection layer (DuraVision Platinum, from ZEISS) and then of the clean-coat layer (AFP 3000+, from Cotec GmbH), each by means of a PVD method.

| Comparative example | Middle thickness of the spectacle lens [mm] |
|---------------------|---------------------------------------------|
| 1 | 1.55 |
| 2 | 1.64 |

II Characterization of the Spectacle Lenses of the Disclosure and of the Spectacle Lenses from the Comparative Examples IIa Ball Drop Test According to 21CFR801.410

The spectacle lenses according to the disclosure of examples 1 to 18 passed the ball drop test without difficulty. They showed no signs at all of damage to the surface. By contrast, the spectacle lenses from comparative examples passed the ball drop test but each showed a star-shaped crack as error profile.

IIb Reduction in the Weight of the Spectacle Lenses of the Disclosure

As well as the thickness of a lens, weight is also of major importance to the user. Wearing comfort in particular is promoted by a minimum weight. It should be noted that D 263® T eco glass from Schott AG has a density of 2.51 g/cm³ and is thus much heavier than polymer substrates based on polyallyldiglycol carbonate (density=1.32 g/cm³). The polymer substrate thus weighs just 52.6% of the mineral glass. To compensate for this additional weight, it is crucial to reduce the middle thickness of the polymer substrate.

For the planar ultrathin lens made of D 263® T eco from Schott AG with a diameter of 70 mm and a thickness of 100 µm, this results in a weight of 965.5 mg; 210 µm results in 2027.5 mg. Given a layer thickness of 100 µm for the adhesive (density 1.32 g/cm³), the combination of ultrathin lens and adhesive results in a weight of 1342.5 mg (ultrathin lens thickness 100 µm) or 2174.9 mg (ultrathin lens thickness 210 µm). There is a corresponding savings potential in the polymer for various reductions in thickness according to the following Table:

| Polymer substrate: polyallyldiglycol carbonate | | Spectacle lens comprising components A (ultrathin lens), adhesives, B (polyallyldiglycol carbonate) | |
|---|---|---|---|
| Reduction in thickness [mm] | Weight saving [mg] | mg difference in total weight of hybrid dome [100 μm] + adhesive [100 μm] | mg difference in total weight of hybrid dome [210 μm] + adhesive [100 μm] |
| 0.1 | 507.74 | 834.7 | 1667.2 |
| 0.3 | 1523.21 | −180.7 | 651.7 |
| 0.4 | 2030.95 | −688.5 | 144.0 |
| 0.5 | 2538.69 | −1196.2 | −363.7 |
| 0.6 | 3046.43 | −1704.0 | −871.5 |
| 0.7 | 3554.17 | −2211.7 | −1379.2 |
| 0.8 | 4061.90 | −2719.4 | −1887.0 |
| 0.9 | 4569.64 | −3227.2 | −2394.7 |

It follows from these calculations that a polymer substrate thinner by 0.3 mm (100 μm ultrathin lens) or 0.5 mm (210 μm ultrathin lens) leads to a finished spectacle lens which is lighter overall. Given current minimum thicknesses in the region of 2 mm for polyallyldiglycol carbonate-based spectacle lenses, the hybrid lenses, with the passing of the FDA ball drop test down to middle thickness 0.41 mm, offers distinct potential for reduction in the weight of a spectacle lens. Examples 5 to 11 and 14 meet this condition.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

The invention claimed is:

1. A process for producing a spectacle lens including, proceeding from a front face on the object side of the spectacle lens to an opposite reverse face of the spectacle lens, at least components A, B, and C, wherein the component A and the component C include an ultrathin lens, wherein the component B includes at least one of a polymeric material or a mineral glass, wherein the ultrathin lens has an average thickness within a range of from 90 μm to 210 μm, wherein the spectacle lens has a middle thickness within a range of from 0.34 mm to 2.22 mm, and wherein the spectacle lens has no damage after impact of a steel ball of a size of 15.87 mm and a weight of 16.36 g from a height of 1.27 m, the process comprising:
providing the ultrathin lens of the component A as a formed ultrathin lens;
providing the ultrathin lens of the component C;
flame treating an edge region of the formed ultrathin lens of the component A and the ultrathin lens of the component C;
providing a finished spectacle lens of the component B including the at least one of the polymeric material or the mineral glass;
optionally, forming a functional layer on at least one of the front face or the reverse face of the component B;
bonding the reverse face of the component A to the front face of the component B and bonding the reverse face of the component B to the front face of the ultrathin lens of the component C; and
edging the spectacle lens including the components A, B, and C,
wherein the ultrathin lens of the component A and the ultrathin lens of the component C are based on a glass composition,
wherein the glass composition of the component A is identical or different from the glass composition of the component C, and
wherein the finished spectacle lens of the component B is a monofocal spectacle lens, a multifocal spectacle lens, a bifocal spectacle lens, a trifocal spectacle lens, a varifocal spectacle lens, or a degressive spectacle lens.

2. The process for producing the spectacle lens as claimed in claim 1, further comprising at least one of:
providing the ultrathin lens of the component C as the formed ultrathin lens;
coating a reverse face of the ultrathin lens of the component A with the functional layer;
coating a front face of the ultrathin lens of the component C with the functional layer;
coating the front face of the finished spectacle lens with the functional layer and the reverse face of the finished spectacle lens with the functional layer;
bonding the coated reverse face of the component A to the coated front face of the component B and bonding the coated reverse face to the coated front face of the ultrathin lens of component C; and
coating the front face of the ultrathin lens of the component A with the functional layer and coating the reverse face of the ultrathin lens of the component C with the functional layer.

3. The process as claimed in claim 1, wherein the components A, B, and C are bonded with an adhesive, by a thermal treatment, or by contact bonding.

4. The process as claimed in claim 1, wherein the components A, B, and C are bonded to one another with an adhesive based on an amine-catalyzed thiol hardening of an epoxy resin at a temperature within a range of from 20° C. to 80° C.

5. The process as claimed in claim 1, wherein the ultrathin lens has an average thickness within a range of from 90 μm to 120 μm.

6. The process as claimed in claim 2, wherein the reverse face of the ultrathin lens of the component A is coated with at least one functional layer, and wherein the at least one functional layer is selected from the group consisting of a coloring layer, a photochromic layer, a polarizing layer, or a reflection layer.

7. The process as claimed in claim 1, wherein at least one of the front face of the ultrathin lens of the component A or the reverse face of the ultrathin lens of the component C is coated with at least one functional layer, and wherein the at least one functional layer is selected from the group consisting of an antireflection layer, an electrically conductive layer, a semiconductive layer, an antifog layer, and a clean-coat layer.

8. The process as claimed in claim 1, further comprising:
providing the ultrathin lens of component A and the ultrathin lens of component C as the formed ultrathin lens.

9. The process as claimed in claim 1, wherein a surface topography of the components A, B, and C is in each case selected from the group consisting of planar, spherical, aspherical, toric, and atoric,
wherein the surface topography of a respective front face and a respective reverse face of the components A and C is a same,
wherein the surface topography of the component A is the same as or different than the surface topography of the component C, and
wherein the surface topography of the component A is the same as or different than the surface topography of the front face of the component B, and the surface topography of the component C is the same as or different than the surface topography of the reverse face of the component B.

10. A process for producing a spectacle lens including, proceeding from a front face on the object side of the spectacle lens to an opposite reverse face of the spectacle lens, at least components A, B, and C, wherein the component A includes an ultrathin lens, wherein the component B includes at least one of a polymeric material or a mineral glass, and wherein the component C includes a functional layer, wherein the ultrathin lens has an average thickness within a range of from 90 μm to 210 μm, wherein the spectacle lens has a middle thickness within a range of from 0.34 mm to 2.22 mm, and wherein the spectacle lens has no damage after impact of a steel ball of a size of 15.87 mm and a weight of 16.36 g from a height of 1.27 m, the process comprising:
providing the ultrathin lens of the component A as a formed ultrathin lens;
flame treating an edge region of the ultrathin lens of the component A;
providing a finished spectacle lens of the component B including the at least one of the polymeric material or the mineral glass;
optionally, forming a functional layer on the front face of the component B;
bonding the reverse face of the component A to the front face of the component B and coating the reverse face of the component B with the functional layer of the component C; and
edging the spectacle lens including the components A, B, and C,
wherein the ultrathin lens of the component A is based on a glass composition, and
wherein the finished spectacle lens of the component B is a monofocal spectacle lens, a multifocal spectacle lens, a bifocal spectacle lens, a trifocal spectacle lens, a varifocal spectacle lens, or a degressive spectacle lens.

11. The process for producing the spectacle lens as claimed in claim 10, further comprising at least one of:
coating a reverse face of the ultrathin lens of the component A with a functional layer;
coating the front face of the finished spectacle lens with the functional layer and the reverse face of the finished spectacle lens with the functional layer; and
bonding the coated reverse face of the component A to the coated front face of the component B.

12. The process as claimed in claim 10, wherein the functional layer of the component C is selected from the group consisting of a coloring layer, a photochromic layer, a polarizing layer, or a reflection layer.

13. The process as claimed in claim 10, wherein the ultrathin lens has an average thickness within a range of from 90 μm to 120 μm.

14. The process as claimed in claim 10, wherein the reverse face of the ultrathin lens of the component A is coated with at least one functional layer, and wherein the at least one functional layer is selected from the group consisting of a coloring layer, a photochromic layer, a polarizing layer, or a reflection layer.

15. The process as claimed in claim 10, wherein the front face of the ultrathin lens of the component A is coated with at least one functional layer, and wherein the at least one functional layer is selected from the group consisting of an antireflection layer, an electrically conductive layer, a semiconductive layer, an antifog layer, and a clean-coat layer.

16. The process as claimed in claim 10, wherein a surface topography of the components A and B is in each case selected from the group consisting of planar, spherical, aspherical, toric, and atoric,
wherein the surface topography of the reverse face of the component A is the same as the surface topography of the front face of the component B, and the surface topography of the front face of the component A is the same as or different than the surface topography of the reverse face of the component B.

17. The process as claimed in claim 10, wherein the components A and B are bonded with an adhesive, by a thermal treatment, or by contact bonding.

18. The process as claimed in claim 10, wherein the components A and B are bonded to one another with an adhesive based on an amine-catalyzed thiol hardening of an epoxy resin at a temperature within a range of from 20° C. to 80° C.

19. A process for producing a spectacle lens including, proceeding from a front face on the object side of the spectacle lens to an opposite reverse face of the spectacle lens, at least components A, B, and C, wherein the component A and the component C include an ultrathin lens, wherein the component B includes at least one of a polymeric material or a mineral glass, wherein the ultrathin lens has an average thickness within a range of from 90 μm to 210 μm, wherein the spectacle lens has a middle thickness within a range of from 0.34 mm to 2.22 mm, and wherein the spectacle lens has no damage after impact of a steel ball of a size of 15.87 mm and a weight of 16.36 g from a height of 1.27 m, the process comprising:
providing the ultrathin lens of the component A and the ultrathin lens of the component C;
flame treating an edge region of the ultrathin lens of the component A and the ultrathin lens of the component C;

providing a finished spectacle lens of the component B including the at least one of the polymeric material or the mineral glass;
optionally, forming a functional layer on at least one of the front face or the reverse face of the component B;
bonding the reverse face of the component A to the front face of the component B and bonding the reverse face of the component B to the front face of the ultrathin lens of the component C;
removing a portion of the edge region of the ultrathin lens of the component A and the ultrathin lens of the component C; and
edging the spectacle lens including the components A, B, and C,
wherein the ultrathin lens of the component A and the ultrathin lens of the component C are based on a glass composition,
wherein the glass composition of the component A is identical or different from the glass composition of the component C, and
wherein the finished spectacle lens of the component B is a monofocal spectacle lens, a multifocal spectacle lens, a bifocal spectacle lens, a trifocal spectacle lens, a varifocal spectacle lens, or a degressive spectacle lens.

* * * * *

UNITED STATES PATENT AND TRADEMARK OFFICE
CERTIFICATE OF CORRECTION

PATENT NO. : 11,921,359 B2
APPLICATION NO. : 16/392760
DATED : March 5, 2024
INVENTOR(S) : Thomas Glöge and Jeremias Gromotka It is certified that error appears in the above-identified patent and that said Letters Patent is hereby corrected as shown below:

In the Specification

In Column 10, Line 16: change "SaO$_2$" to -- SnO$_2$ --

In Column 18, Line 49: change "and" to -- und --

Signed and Sealed this
Eighteenth Day of June, 2024

Katherine Kelly Vidal
*Director of the United States Patent and Trademark Office*